(12) United States Patent
Rouse

(10) Patent No.: US 7,278,245 B2
(45) Date of Patent: Oct. 9, 2007

(54) RADIAL-HINGE MECHANISM

(76) Inventor: Glenn R. Rouse, P.O. Box 2122, Traverse City, MI (US) 49685

( * ) Notice: Subject to any disclaimer, the term of this patent is extended or adjusted under 35 U.S.C. 154(b) by 599 days.

(21) Appl. No.: 10/623,787

(22) Filed: Jul. 21, 2003

(65) Prior Publication Data

US 2005/0016109 A1    Jan. 27, 2005

(51) Int. Cl.
E04B 1/19 (2006.01)
E04B 1/343 (2006.01)
A47B 3/00 (2006.01)
A47C 4/00 (2006.01)
E04C 3/00 (2006.01)

(52) U.S. Cl. .......... 52/646; 52/655.1; 52/664; 52/632; 52/108; 403/171; 403/176; 403/220; 343/881; 297/16.2; 297/18; 108/118; 428/12

(58) Field of Classification Search ........ 52/81.1–81.3, 52/645, 646, 655.1, 664, 632, 108, DIG. 10; 446/107; 434/211; 403/171, 176, 220; 428/542.2, 428/11, 12; 343/880–882; 248/164; 108/118; 297/16.2, 18

See application file for complete search history.

(56) References Cited

U.S. PATENT DOCUMENTS

| 3,351,376 | A | * | 11/1967 | Shimizu | 297/16.2 |
|---|---|---|---|---|---|
| 3,546,049 | A | | 12/1970 | Kostich | |
| 3,830,011 | A | | 8/1974 | Ochrymowich | |
| D238,840 | S | | 2/1976 | Cassina | |
| 4,253,284 | A | * | 3/1981 | Bliss | 52/109 |
| 4,259,790 | A | | 4/1981 | Borisof | |
| 4,731,962 | A | | 3/1988 | Kittner et al. | |
| 4,825,225 | A | * | 4/1989 | Waters et al. | 343/881 |
| 4,927,674 | A | * | 5/1990 | Smith | 428/11 |
| 5,316,483 | A | * | 5/1994 | Esterle | 434/211 |
| 5,320,404 | A | * | 6/1994 | Le Gal | 297/16.2 |
| D405,626 | S | * | 2/1999 | Ossip | D6/462 |
| D407,580 | S | * | 4/1999 | Ossip | D6/462 |
| 6,441,801 | B1 | * | 8/2002 | Knight et al. | 343/915 |
| 6,497,498 | B2 | * | 12/2002 | Adams | 362/252 |
| 6,542,132 | B2 | * | 4/2003 | Stern | 343/915 |

OTHER PUBLICATIONS

One page of woodcut-print in series of 141 items from unpublished treatise on machines by Johann E.E. Bessler, dated 1733.

* cited by examiner

Primary Examiner—Robert Canfield
(74) Attorney, Agent, or Firm—Price, Heneveld, Cooper, DeWitt & Litton, LLP

(57) ABSTRACT

A radial-hinge mechanism includes one or more elongated members arranged and interconnected into a unique, geometry-based, closed-loop assembly often resembling a multi-point star when in its fully-closed mode. The mechanism's signature function is its variable nature of pivoting open from a centralized hinge-core as its substantially circular inner-aperture concurrently contracts in its own circular dimensions. Additionally, the mechanism has a natural susceptibility to spring-biasing techniques to further modify its versatility and performance. Applications for the mechanism include numerous support frameworks along with devices and apparatus encompassing the likes of: sheaves and spools; weight-scales and elevators; shock and impact absorbers; throwers and grabbers; interfaces with bellows for valves and pumps; interfaces with fans, props and cutters; interfaces with shafts for functions of braking, clutching, gripping; and a stacking of radial-hinge mechanisms or casting in arrays; in addition to combinations of forms and attachments applicable to the mechanism's multi-functional propensities.

60 Claims, 13 Drawing Sheets

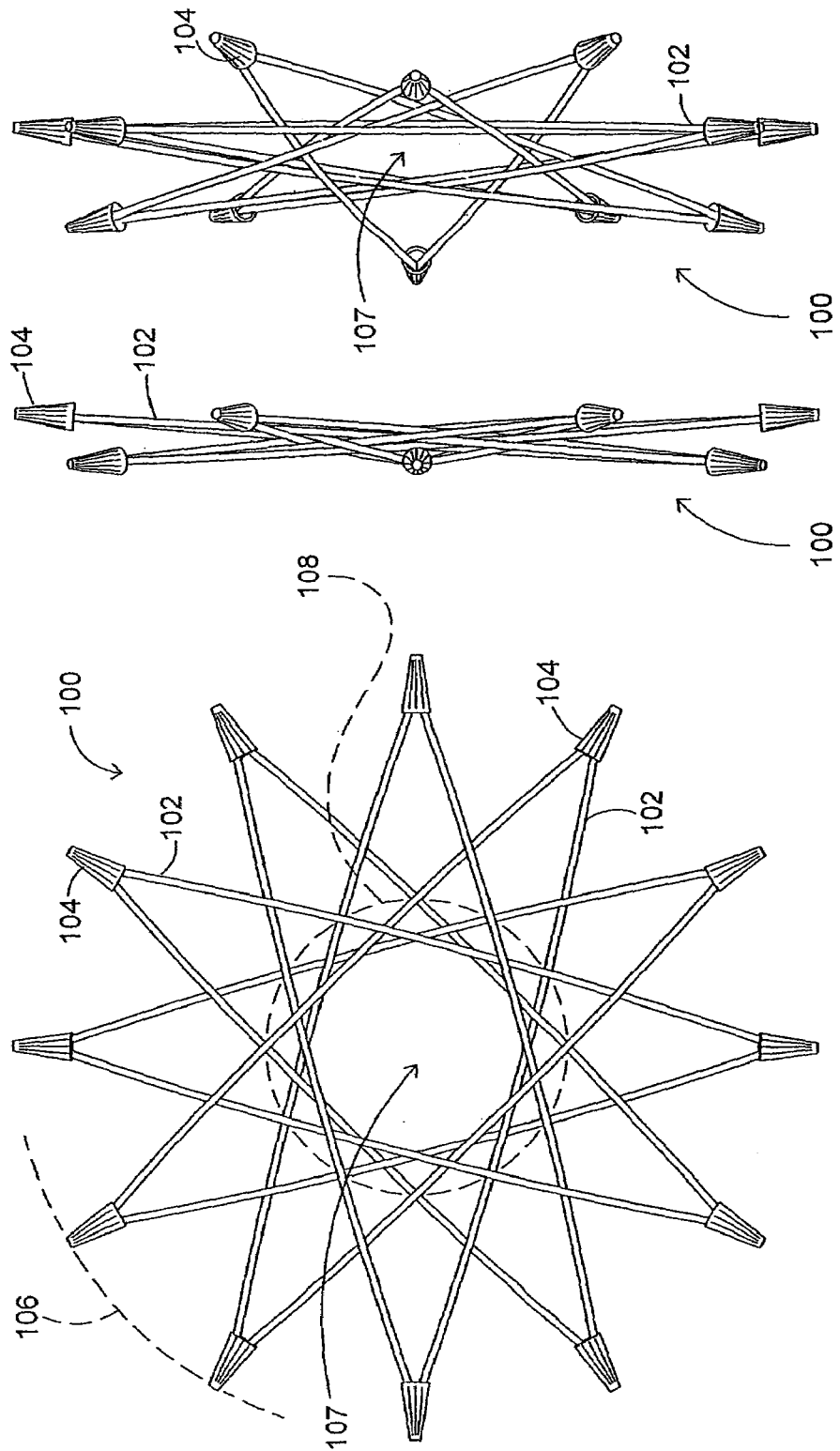

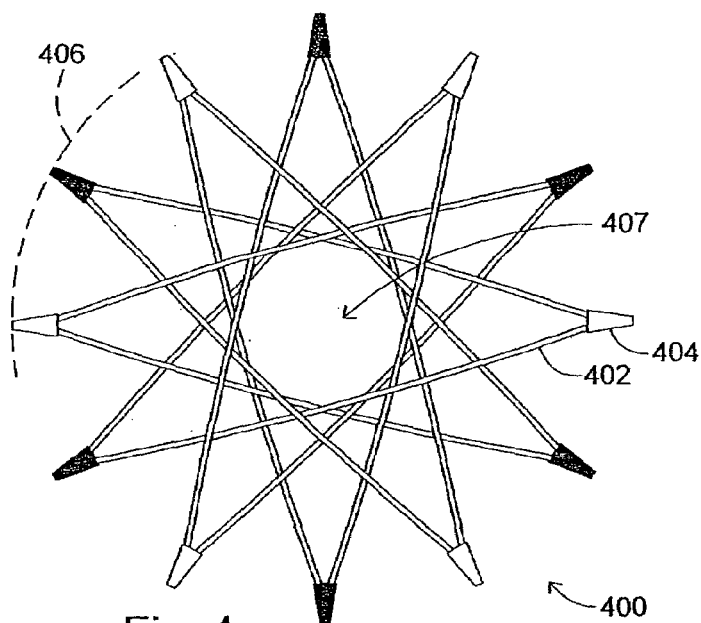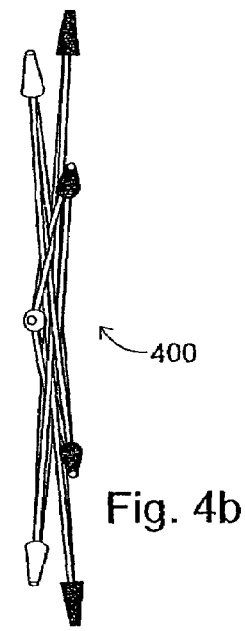
Fig. 4a  Fig. 4b
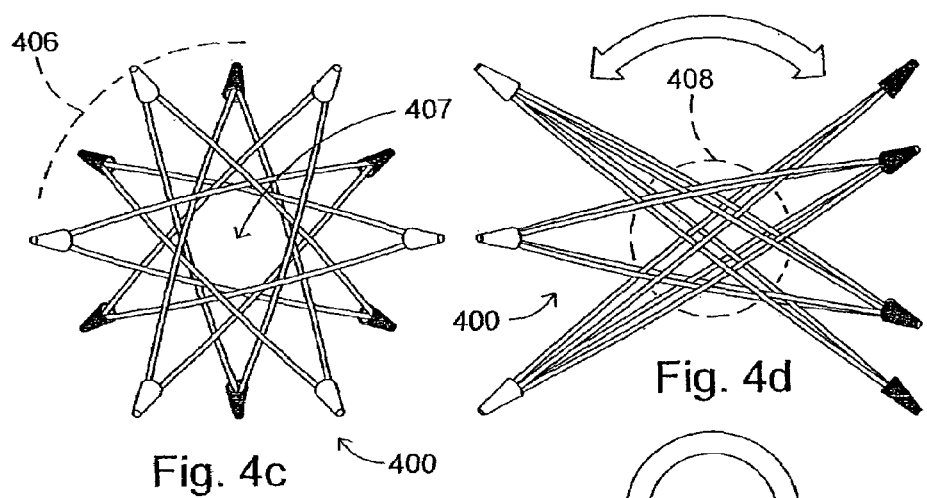
Fig. 4c  Fig. 4d
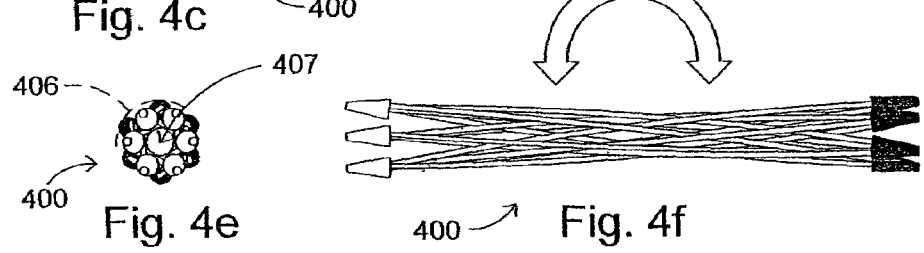
Fig. 4e  Fig. 4f

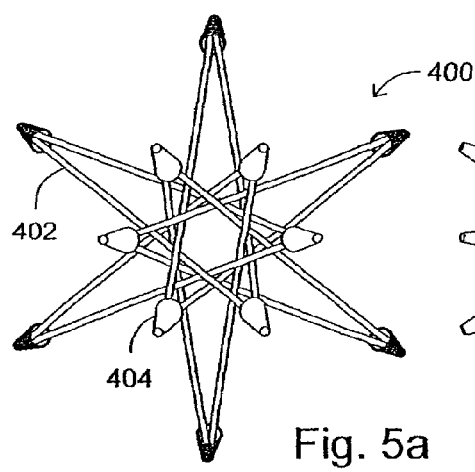
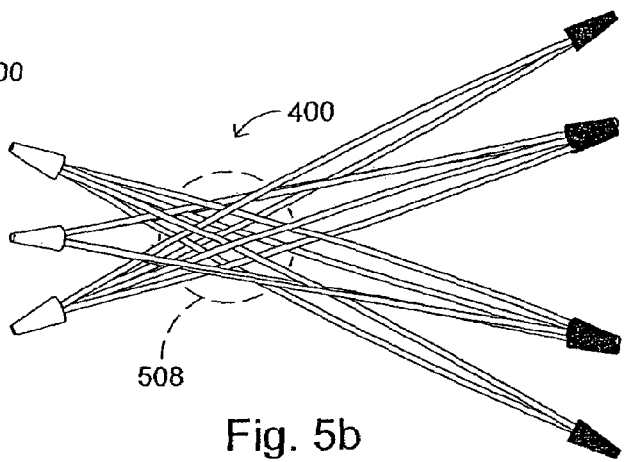
Fig. 5a    Fig. 5b
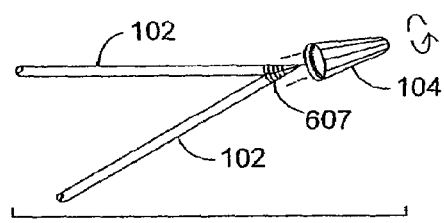
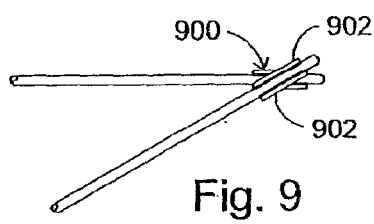
Fig. 6    Fig. 9
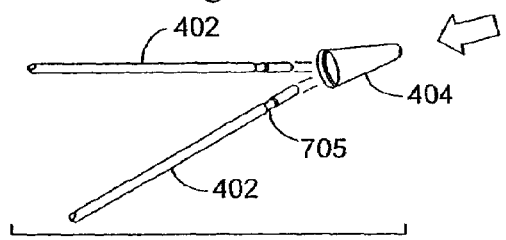
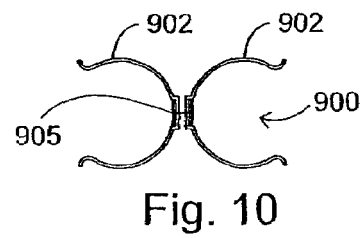
Fig. 7    Fig. 10
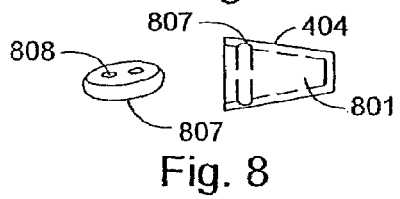
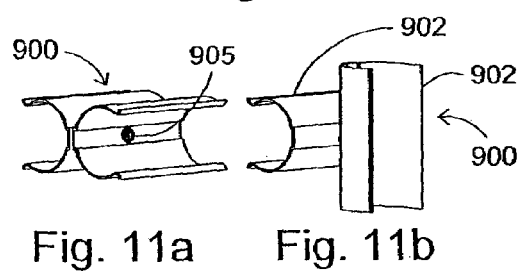
Fig. 8    Fig. 11a    Fig. 11b

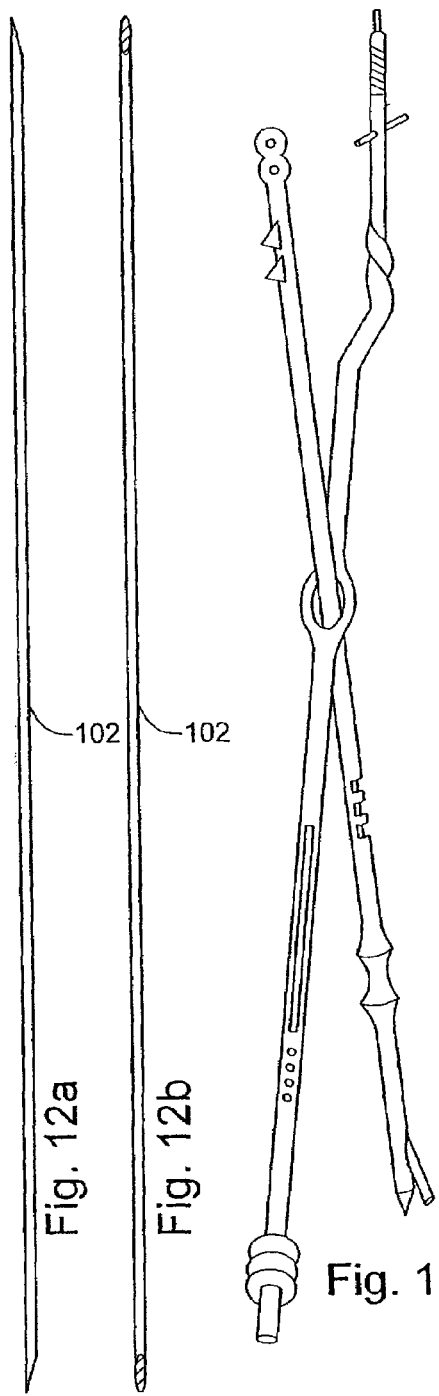
Fig. 12a
Fig. 12b
Fig. 13
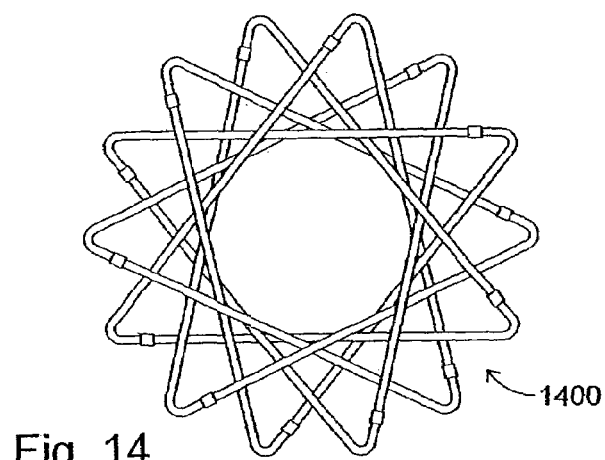
Fig. 14
Fig. 15
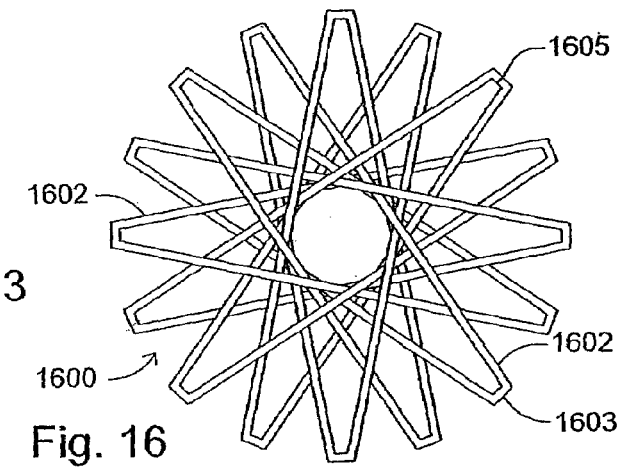
Fig. 16

| SPOKE COUNT | ARC-COUNT PER CHORD | | | | |
|---|---|---|---|---|---|
| | 3 | 5 | 7 | 9 | 11 |
| 8 | ✻ | | | | |
| 10 | ✻ | | | | |
| 12 | — | ✻ | | | |
| 14 | ✻ | ✻ | | | |
| 16 | ✻ | ✻ | ✻ | | |
| 18 | — | ✻ | ✻ | | |
| 20 | ✻ | — | ✻ | ✻ | |
| 22 | ✻ | ✻ | ✻ | ✻ | |
| 24 | — | ✻ | ✻ | ✻ | ✻ |
| 26 | ✻ | ✻ | ✻ | ✻ | ✻ |

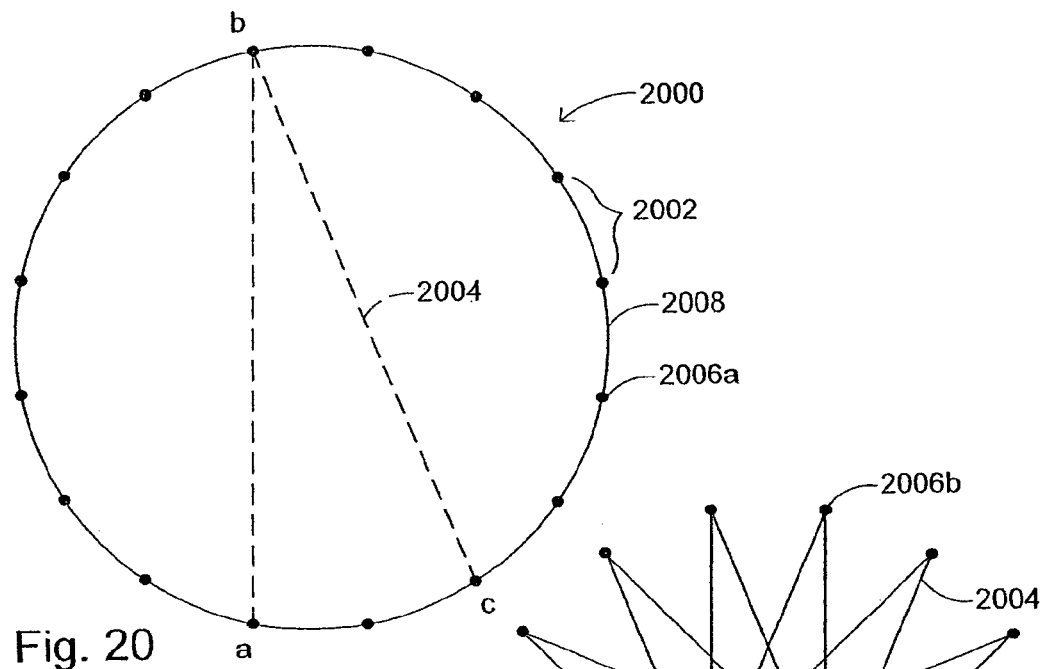
Fig. 20
Fig. 21
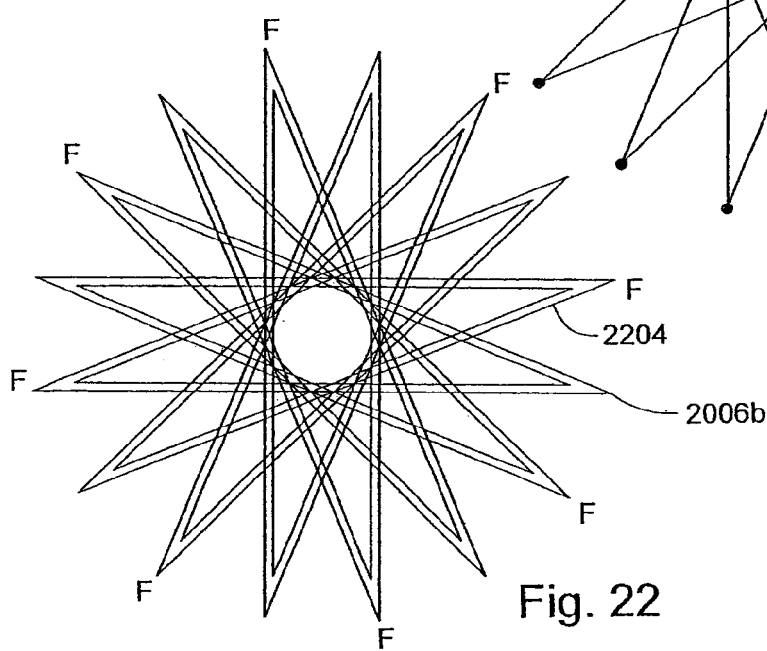
Fig. 22

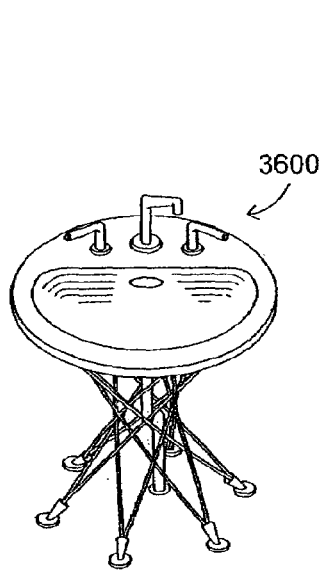
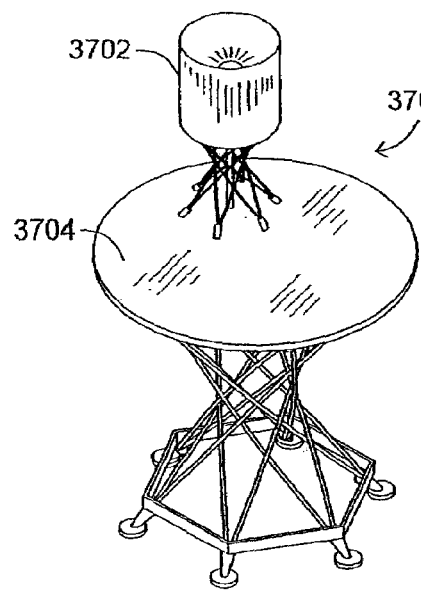
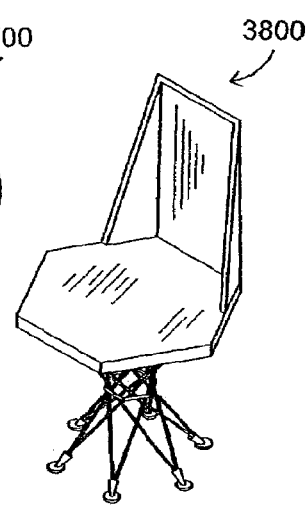
Fig. 36         Fig. 37         Fig. 38
Fig. 39
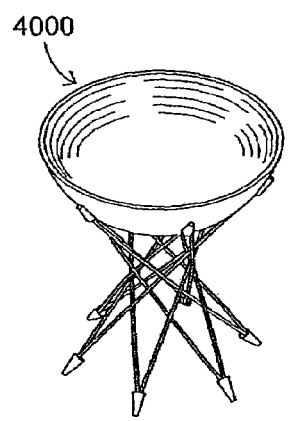
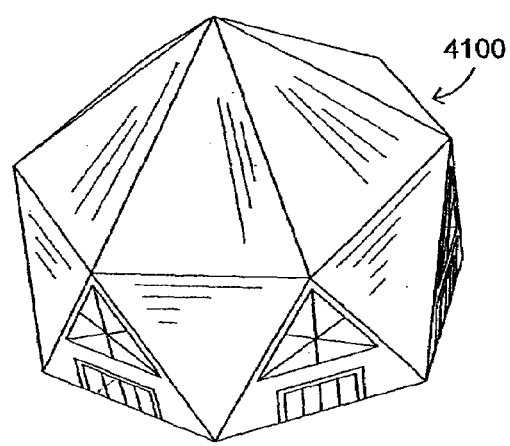
Fig. 40                    Fig. 41

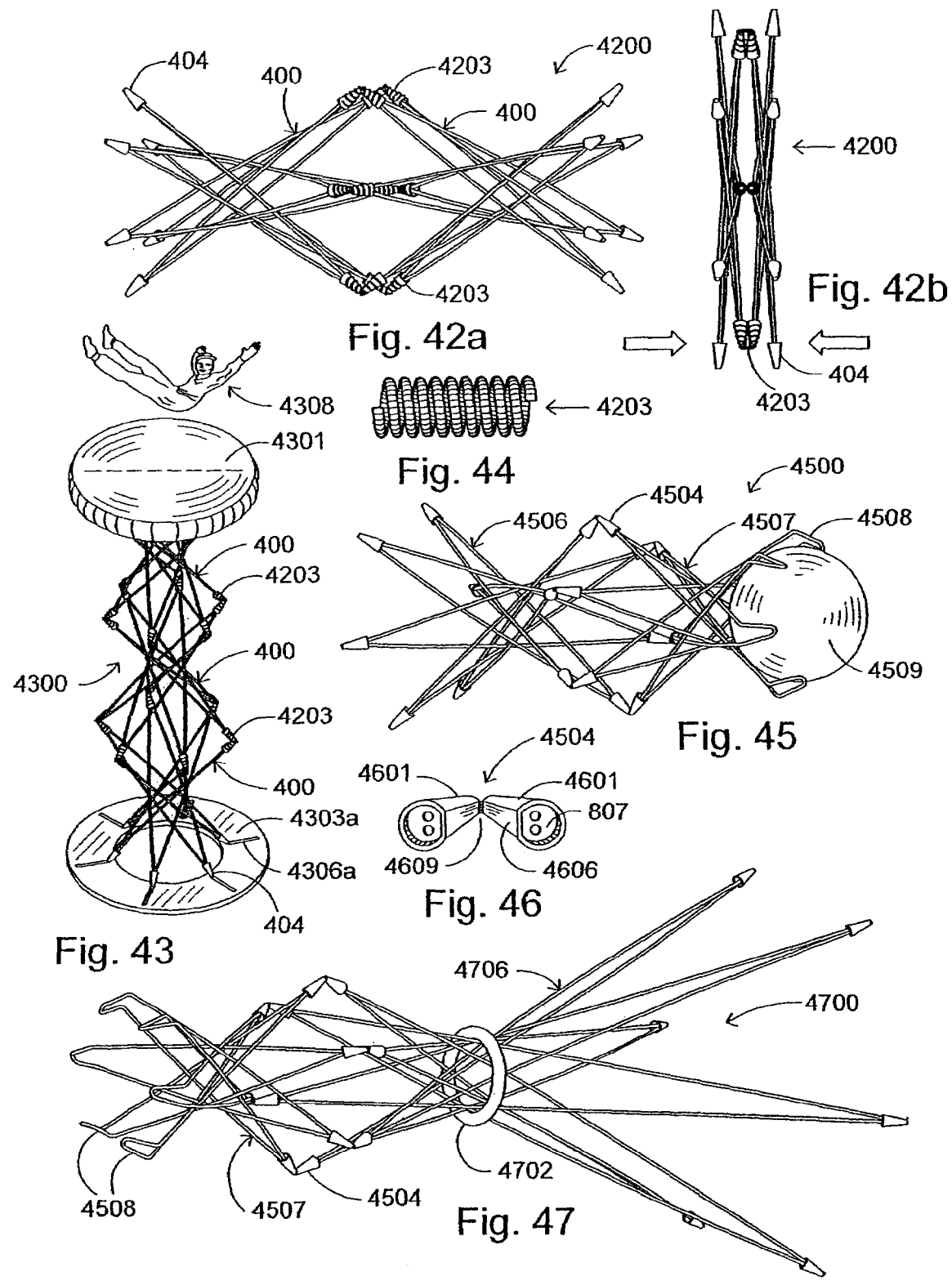

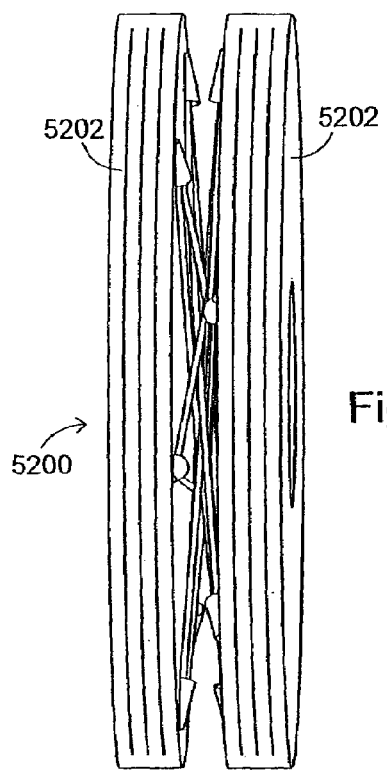
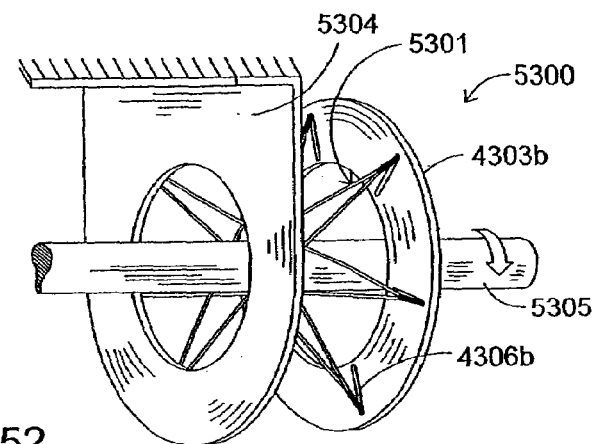
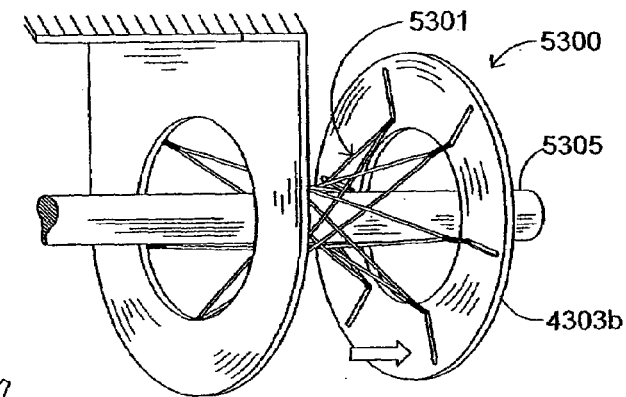
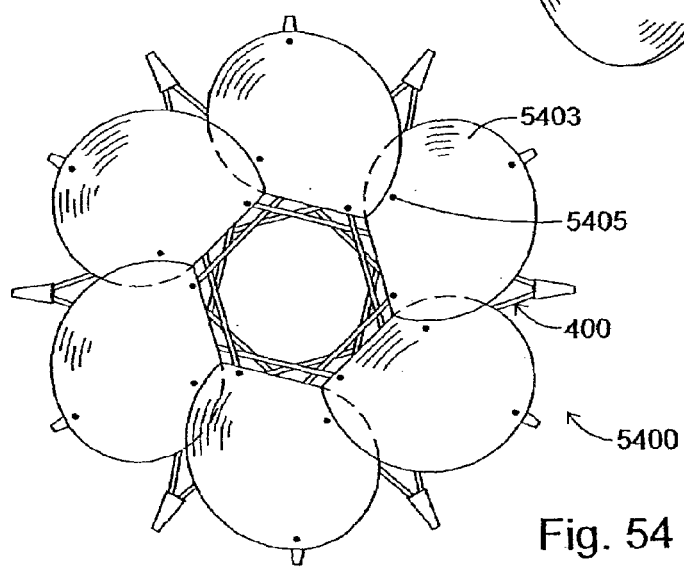
Fig. 52
Fig. 53a
Fig. 53b
Fig. 54

RADIAL-HINGE MECHANISM

BACKGROUND OF THE INVENTION

The present invention is directed to a radial-hinge mechanism and, more specifically, a radial-hinge mechanism that includes a plurality of elongated interwoven elements.

A variety of prior art devices have utilized elongated elements to form a structure. For example, U.S. Pat. No. 4,731,962 discloses a compression-tension unit for use in a tensile-integrity structure or in combination with similar compression-tension units in such a structure. This compression-tension unit includes elongated rigid struts of circular cross-section that each include slotted ends which receive a portion of an elastic cord to connect one strut to another.

As another example, U.S. Pat. No. 3,546,049 discloses a device that includes a plurality of beams formed from sets of elongated elements. In one embodiment, the device includes four beams, each including two elements symmetrically arrayed about a geometric center or axis of the beam. These beams contact at a single common point and the elements of each beam are joined together at each end. The elements of each beam pass through a region of beam intersection and the elements of any given beam are generally parallel to each other in the region of joining and are interleaved with elements of each other beam in accordance with a uniform pattern. The beams slide within a predetermined degree of freedom with respect to each other. However, these devices do not join the ends of one beam with an end of another beam, nor are any of these designs and devices based on one continuous interweaving loop of elongated elements.

U.S. Pat. No. 3,830,011 discloses a model kit for building different geometric structures and includes a plurality of struts, which are hollow tubular members, and hub connectors, which are utilized to connect an end of one strut to ends of one or more other struts. U.S. Pat. No. 4,259,790 discloses an educational device that includes a plurality of elongated sticks, rods or tubes with adhesive material mounted on both ends of a respective stick, rod or tube such that the elements can be adhered to one another to form letters, symbols, figures and geometric designs. Finally, U.S. Design Pat. No. D 238,840 discloses an ornamental design for a geometric table support structure that uses a plurality of elongated members.

While the above-described patents disclose beams (also called out as struts, rods, sticks, tubes, members and elements), which may be utilized in conjunction with each other to form various structures, these structures are not capable of radial-hinge movement nor do their completed forms result in unitized continuous-loop frameworks that evenly distribute loads, transfer forces, and assist or resist with various spring-action potentials.

SUMMARY OF THE INVENTION

The present invention is generally directed to a radial-hinge mechanism comprised of one or more elongated members arranged and interconnected around a substantially circular inner-aperture according to specific design-parameters resulting in a unique assembly having a natural and variable propensity for radially-pivoting open upon a substantially circular, centrally-located hinge-core. In addition, these design-parameters apply to a vast family of radial-hinge mechanisms, all contingent upon having an even number of crossmembers of eight or more.

Accordingly, embodiments of the present invention provide versatile mechanisms for a multitude of novel applications across a wide range of products and forms.

In one particular, the mechanism provides an alternative to the conventional coil-spring by circumventing the need for curved and/or coiled members.

In addition, spring-biasing techniques applied to the invention's natural properties further enhance the mechanism's usefulness as a semi-rigid framework and/or an active, flexible framework. And, in its active hinge-form, the invention also provides superior radially-pivoting motion without requiring the usual brackets and hardware of conventional hinge forms.

In light of the invention's equilateral nature through its opening/closing stroke, the invention may also be interconnected with similar mechanisms along compound points of common intersection which may also be hinged, sprung, etc., and yielding a stacked configuration for two or more radial-hinge mechanisms.

Along with its most common capacities to perform alone or with similar mechanisms in an active or rigid role with its elongated members mainly employed for support and/or projection motion, there are also likely opportunities for radial-hinge mechanisms interfacing with encasements and bellows, propellers, blades, fins, shafts, etc.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 1 is a front view of a twelve-spoke radial-hinge mechanism in a fully-closed position;

FIG. 2 is a side view of the mechanism of FIG. 1;

FIG. 3 is a perspective view of the mechanism of FIG. 1;

FIG. 4*a* is a front view of a fully-closed twelve-spoke radial-hinge mechanism with six black and six white spoke-end connectors;

FIG. 4*b* is a side view of the fully-closed mechanism of FIG. 4*a*;

FIG. 4*c* is a front view of the half-opened mechanism of FIG. 4*a*;

FIG. 4*d* is a side view of the half-opened mechanism of FIG. 4*a* and showing the general locale of a hinge-core;

FIG. 4*e* is a front view of the fully-opened mechanism of FIG. 4*a*;

FIG. 4*f* is a side view of the fully-opened mechanism of FIG. 4*a*;

FIG. 5*a* is a front view of a more-than-half-opened mechanism of FIG. 4*a* with a hinge-core somewhat translocated;

FIG. 5*b* is a side view of the mechanism of FIG. 5*a* and showing the general locale of the translocated hinge-core;

FIG. 6 is a partial front view showing beveled ends of two spokes threaded and connected by a screw-on connector;

FIG. 7 is a partial front view showing two spokes with channels configured to fit into a push-on connector;

FIG. 8 is another view of the push-on connector of FIG. 7, composed of a cap and grommet;

FIG. 9 is a partial front view showing two spokes connected by a double-clip connector;

FIG. 10 is a side view of the double-clip connector of FIG. 9;

FIG. 11*a* is a perspective view of the connector of FIG. 10;

FIG. 11b is also a perspective view of the connector of FIG. 10, with one clip swiveled ninety degrees from the position shown in FIG. 11a;

FIG. 12a is a front view of a radial-hinge spoke beveled at both ends for joining with a second spoke, as depicted in FIG. 6;

FIG. 12b is a side view of the spoke in FIG. 12a;

FIG. 13 is a perspective view of two atypical radial-hinge spokes demonstrating a variety of spoke alterations;

FIG. 14 is a front view of a fourteen-spoke radial-hinge mechanism, with five arcs per chord, whose spokes are joined by couplings offset from the mechanism's peripheral points;

FIG. 15 is a front view of a sixteen-spoke radial-hinge mechanism, with five arcs per chord, formed out of one elongated member and fused at one location;

FIG. 16 is a front view of a sixteen-spoke radial-hinge mechanism, with seven arcs per chord, formed out of one elongated member and fused at one location;

FIG. 20 is a front view of a circle diagram that is divided into an even number of arcs and representing a first step in the design of a sixteen-spoke radial-hinge mechanism;

FIG. 21 is a front view of a chord diagram derived from the circle diagram of FIG. 20, with the chord segments drawn and the outer circle removed;

FIG. 22 is a front view of the chord diagram of FIG. 21, with spokes drawn in to form a spoke diagram;

FIG. 36 is a perspective view of a radial-hinge employed in a radial-hinge sink/stand apparatus;

FIG. 37 is a perspective view of a radial-hinge employed in both a lamp apparatus and a table apparatus;

FIG. 38 is a perspective view of a radial-hinge chair apparatus;

FIG. 39 is a side view of a radial-hinge bed apparatus;

FIG. 40 is a perspective view of a radial-hinge birdbath, solar-collector or other receiving-dish apparatus;

FIG. 41 is a perspective view of a radial-hinge stadium or large tent structure, with a pitched roof from center;

FIG. 42a is a perspective view of a side view of a more-than-half-opened, interconnected stack of two radial-hinge mechanisms;

FIG. 42b is a side view of the fully-closed device of FIG. 42a;

FIG. 43 is a perspective view of a three-high stack of radial-hinge mechanisms employed in a G-decelerator apparatus;

FIG. 44 is a side view of a standard coiled-spring employed to hold radial-hinge mechanisms together at their peripheral points to create a stack, as in FIGS. 42a-43;

FIG. 45 is a perspective view of a stack of two similar radial-hinge mechanisms with one mechanism fashioned into a hand-device for gripping and holding an object;

FIG. 46 is a perspective view of a double-capped inter-hinge connector similar to the single-cap design in FIGS. 7-8, though here attached by a line hinge to create another kind of radial-hinge connector for stacking, as in FIGS. 45 and 47;

FIG. 47 is a perspective view of a stack of two differently sized radial-hinge mechanisms with one being the hand-device of FIG. 45 and the other a larger mechanism whose hinge-core is translocated and equipped with a constraining band;

FIG. 48 is the front view of a single butterfly-like bellows-insert interfaced within and around the radial-hinge mechanism of FIG. 4a;

FIG. 49b is a side view of the single bellows-insert of FIG. 49a;

FIG. 51b is a side view of the partially-opened compound bellows of FIG. 51a;

FIG. 52 is a perspective view of a radial-hinge wheel apparatus;

FIG. 53a is a perspective view of a radial-hinge braking/clutching apparatus shown with an inner-aperture of the radial-hinge opened enough to allow free rotation of the shaft on an imaginary fixed axis;

FIG. 53b is a perspective view of the same apparatus of FIG. 53a, but here shown with the radial-hinge mechanism closing its inner-aperture down upon the shaft and stopping the shaft's rotation; and FIG. 54 is a front view of a radial-hinge mechanism interfaced with fan-like blades resulting in a variably-adjustable radial-hinge fan, prop or turbine apparatus.

DETAILED DESCRIPTION OF PREFERRED EMBODIMENT(S)

Figures 17, 18, 19:
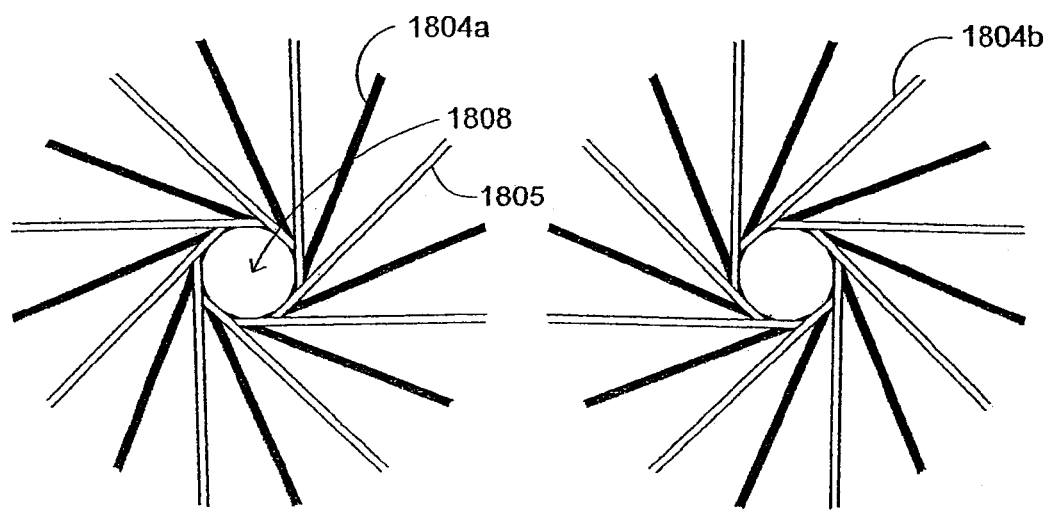
FIG. 17 is a partial chart showing twenty-six versions of a radial-hinge mechanism for spoke-counts of eight to twenty-six with a sixteen-spoke version emphasized.
FIG. 18 is a graphic representation to illustrate the basic infrastructure of a sixteen-spoke radial-hinge design, with seven arcs per chord.
FIG. 19 is the mirror image of the infrastructure of FIG. 18.

The present invention is directed to a radial-hinge mechanism comprised of one or more elongated members arranged, formed and interconnected around a substantially circular inner-aperture into a specific closed-loop assembly which unitizes the mechanism's structure and actualizes its potential to perform similar to a scissor-hinge. Furthermore, this mechanism includes a hinge-core that can move or be translocated laterally within the framework, with crossmembers radiating out tangentially from the inner-aperture. In addition, this closed-loop assembly is based on unique geometric design-parameters, which also apply to a vast family of radial-hinge mechanisms, ranging in spoke-count from eight to infinity on the even-number scale. However, it should be appreciated that when the number of the spokes of the radial-hinge mechanism exceed a certain higher enumeration, the mechanism may not be capable of realistic implementation due to material and dimensional limitations.

With reference to FIGS. 1-3, a twelve-spoke radial-hinge mechanism 100 includes a plurality of spokes 102 and an equal plurality of spoke-end connectors 104. The mechanism 100 is also defined by an outer-circumference 106, an inner-aperture 107 and a central-complex of spoke-crossings (generally located) and referred to as a hinge-core 108. In FIGS. 4a-4f, a twelve-spoke radial-hinge mechanism 400 (similar to the mechanism 100 in FIGS. 1-3) is shown in three positions over the full range of its movement, from totally closed in FIGS. 4a-4b to totally open in FIGS. 4e-4f, with FIGS. 4c-4d posing the half-opened/half-closed position (more or less). Both front and side views are shown for each position, with all views dimensionally proportional. In FIGS. 5a-5b, front and side views of radial-hinge mechanism 400 depict a laterally-translocated radial-hinge core 508 in FIG. 5b, as compared to a more equilaterally-positioned hinge-core 408 in FIG. 4d. In FIGS. 6-11, three different basic spoke-to-spoke connecting-devices are depicted. FIGS. 12 and 13 illustrate a few ideas for spoke-design from simple to extreme and FIGS. 14-16 depict three other versions and forms of radial-hinge mechanisms.

A. Spokes, Peripheral Points and Parallel Planes

The spokes of a radial-hinge mechanism are given their common name to best represent their posture in a circle and their resemblance to spokes on a common wheel. Alternatively, the word spokes could be replaced with struts, arms, legs, rods, sticks, spars, tubes, links, beams, poles, levers, members, etc.

With reference again to FIGS. 1-3, spokes 102 of the twelve-spoke radial-hinge mechanism 100 are substantially equal in length with consistent cross-sectional dimensions. The spokes 102 are made from straight stock, though bent slightly to fulfill the requirement of achieving a three-dimensional mechanism out of a two-dimensional design-space and this bending effect invariably adds tension to the entire framework, especially when the mechanism is in its fully interconnected form. Often, a spoke material with some degree of elasticity helps keep the task of construction at a manual level.

In addition and typically, radial-hinge spokes of consistent cylindrical cross-section encounter less friction than most other cross-sectional shapes for spokes. As such, the enclosed drawings predominantly employ this cylindrical form. Alternatively, specialized cross-sectional shapes may better accommodate certain applications. Furthermore, while the radial-hinge mechanism generally utilizes straight elongated members for spokes, the spokes may also be kinked, twisted, looped, jagged or erratic in various ways to achieve a desired result. FIG. 13 suggests a few forms and added features for radial-hinge spokes to achieve one or another desired application.

It should also be appreciated that smooth spoke surfaces will generally more easily slide across each other to enhance radial-hinge action, which may also be improved with lubricants. Ball-bearings in tubed spokes generally also reduce friction. It should be appreciated that in some applications it may be desirable to increase as opposed to decrease friction associated with the contact of one or more spokes. The spokes of a radial-hinge mechanism may be made from rigid or flexible materials or a combination of both and made out of wood, plastic, fiberglass, appropriate metals and alloys, spring steel, composites and any other combination of matter to realize a reliable spoke-member for the desired purpose at hand.

Furthermore, rigid spokes employed in radial-hinge mechanisms generally require more force to open the mechanism in contrast to the lower-resistance properties of flexible members and some rigid constructions may not open at all, though also depending on properties of their connections and/or connectors. In general, thinner spokes will also bend open more easily than thicker spokes. Reverse-biasing of the spring-action in any joint or member of a radial-hinge mechanism may also create opposite or other effects.

While the radial-hinge embodiments discussed herein include elongated interwoven spokes that are generally of the same length, inconsistent spoke-lengths may be desirable in certain applications and, when implemented, this variance in framework may disrupt the radial-hinge's common feature of having its opposing peripheral points in parallel planes.

A peripheral point is the specific designation for a point on the circle of a radial-hinge design and cotangent with the not-always-specific point-ends on the protrusions of conjoined spokes on the periphery of a radial-hinge mechanism. A peripheral point is thereby a loose designation for a location where the pathway of one spoke turns into the pathway of an adjoining spoke. In FIG. 16, the peripheral point includes the entire spoke-end segment 1603.

Figure 27:
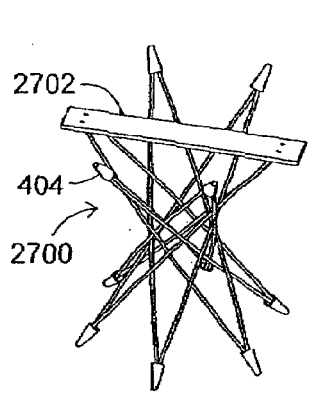
FIG. 27 is a perspective view of a radial-hinge device comprised of a radial-hinge mechanism held open by a single connecting slat, which also displaces two peripheral points.

Distorting one or more of a mechanism's peripheral points after its construction may just as decisively disrupt the parallel-plane arrangements (see, for example, FIG. 27). It should be appreciated that radial-hinge mechanisms have no specific requirement to limit their multi-dimensional frameworks to only parallel-plane displacements of their plurality of peripheral points, even though their initial design pattern is founded on the parallelism of two sets of an equal number of peripheral points in two planes.

All embodiments of radial-hinge mechanisms generally conform to the conceptual rule of having an equal number of spokes to the number of peripheral points. However, these usually prominent protrusion points of a radial-hinge mechanism will not always be distinguished by actual points, and may rather be hidden in other variable and non-pointed transitional forms or compound curves or, conversely, be exaggerated into compound points. Spokes may also be constructed as tubes internally strung together by an elastic or inelastic cord, wire, etc., tied at both ends and, in this design, function like a modern tent-frame apparatus employing segmented, hollow tubes internally strung with elastic cord. The employment of tubes (hollow cylinders) further suggests tubes sliding within tubes, thus telescoping cylinders to constitute spokes and realizing a radially-adjustable mechanism.

In addition, spokes may have protrusions of various sorts and/or be pierced with holes, flutes, notches, keyways, cavities such that other spokes can pass through, e.g., see FIG. 13. Various types, sizes, shapes, forms and specialties in spoke-design may be utilized in combination to construct a radial-hinge mechanism and the spokes may have connections made anywhere along their bodies (see FIG. 14) and/or at their spoke-ends, and these joints may be fused, fastened, formed or loosely or oddly strung, hooked, screwed, pinned, lashed, rung or otherwise joined/placed together, as determined by application. The spokes may also be carriers of other useful alterations and/or attachments, consisting of tools, fixtures, collars, levers, arms, etc. Many other creative changes in spoke-design will help to fine-tune these key members of radial-hinge mechanisms for common and special applications.

As shown in FIGS. 15 and 16, radial-hinge mechanisms 1500 and 1600, respectively, are both examples of radial-hinge mechanisms each comprised of only one elongated member formed into the radial-hinge design, with a plurality of spoke-links apparent. To keep nomenclature consistent, these spoke-links will also be referred to as spokes. Hence, the radial-hinge mechanisms 1500 and 1600 are both comprised of a plurality of spokes 1502 and 1602, respectively. The mechanisms 1500 and 1600 are made complete by single fusion points 1505 and 1605, respectively. Any single elongated member constituting the full plurality of spokes of a particular radial-hinge mechanism may be made from a single length of wire, wirerope, rod, etc., which is bent or otherwise formed into the designated assembly, with its two remaining ends then joined by a connector, fused, or joined in another manner. Furthermore, the sixteen-spoke radial-hinge mechanism 1500 of FIG. 15 is fashioned with loop-end peripheral points 1503, suggesting yet another alteration in the nature of the radial-hinge mechanism to accommodate a special application.

B. Connections and Connectors

The radial-hinge mechanisms 1500 and 1600 are comprised of a plurality of spokes 1502 and 1602, respectively, and both mechanisms are made from one elongated member fused and/or connected at the confluence of their loose ends. It should be appreciated that there is only one connection to be made on a radial-hinge mechanism comprised of just one elongated member. However, radial-hinge mechanisms of other embodiments may require more than one connection or connector to achieve full interconnectedness and desired usefulness. As with a single connection, these multiple connections may be achieved by direct fusion, gluing, nailing, screwing, pinning, bolting, clamping, lashing, adjoining spoke-ends (or spoke-bodies) together loosely, rigidly, variably and/or by the implementation of one of a vast species of spoke-end connectors.

In FIGS. 1-3, the twelve-spoke radial-hinge mechanism 100 is equipped with twelve spoke-end connectors 104. As shown, the connectors 104 are screw-on caps, each holding together two identical spokes 102. As illustrated in FIG. 12a, ends of the spoke 102 are beveled at one-half the angle of the converging angle (where two spokes 102 come together) and their ends may be cut with a spiral thread 607, as depicted in FIG. 6, after which the spoke-end connector 104 is firmly screwed on. This type of connector will generally constitute a relatively rigid condition throughout the framework of the radial-hinge mechanism 100.

Radial-hinge mechanisms employing spoke-end connectors made with the intent to impose rigidity by preventing the twist of spoke-ends will operate very similar to radial-hinge mechanisms that are welded, fused, glued or formed and expressly meant to be unyielding. Consequently, solidly-interconnected radial-hinge mechanisms will generally fail to open as far or as easily, requiring a greater applied force to overcome the constriction of the fixed joints and creating an impressed and consistent spiral-torsion from the spiral-twisting in every spoke as the radial-hinge exercises its motion opening and closing. A torsion varying in intensity depending upon many variables in materials and form. In contrast, radial-hinge mechanisms interconnected with connectors that allow twist to occur within their grasp are also mechanisms that open more easily and to a greater extent.

In FIGS. 4a-4f, a twelve-spoke radial-hinge mechanism 400 is depicted in front and side views over three typical positions. The mechanism 400 is of similar construction to the mechanism 100 in FIGS. 1-3, except that mechanism 400 employs spokes 402, which are different from spokes 102 by not being beveled and threaded. That is, the spokes 402 are equipped with ring-around-channels 705, as shown in FIG. 7. In addition, spoke-end connectors 404 are not screw-on connectors like connector 104 but push-on connectors, as depicted in FIGS. 7 and 8. The spoke-end connectors 404 are shown in both white and black (color-coded) to enhance understanding of the balanced distribution of the peripheral points and their relationship in all views of radial-hinge mechanism 400 in FIGS. 4a-4f and 5a-5b.

The twelve spoke-end connectors 404 of mechanism 400 are designed to allow the spoke-ends more freedom to twist, rather than be wedged rigidly into place, such as in the connector 104 design of FIG. 6. Consequently, with more freedom at these nexus points, the radial-hinge mechanism will generally open to its full extent, as shown in FIGS. 4e-4f, whereas the radial-hinge mechanism 100 in FIGS. 1-3 might only reach the half-opened position, as observed in FIGS. 4c-4d, and also be on the verge of breaking a spoke due to elastic limits. But, of course, in some applications, it may be desirable to limit movement to a middle range, or more, or less. Moreover, it should be appreciated that the material properties of the spokes 402 and end connectors 404 are influential in determining the extension/contraction (opening and closing) limits and powers of mechanism 400.

With specific reference to FIG. 7, the connectors 404 push on to the ends of the spokes 402 and hold together pairs of the spokes 402. The ends of the spokes 402 are rounded off and, at a predetermined distance from both ends of the spokes 402, a channel 705 is cut or otherwise scribed around the circumference. The channels 705 are intended to interface with holes 808 in double-holed grommets 807, shown in FIG. 8. The grommets 807 are substantially fixed or glued into the bodies of connectors 404 and considered to be fixed parts of the connectors 404. The grommets 807 each hold two spokes 402 together as the inner-casing 801 of connectors 404 limit much of the lateral movement of the spokes 402. The grommets 807 may be made of rubber or other elasticized material or composition. In further consideration, channels 705 may fit snugly into grommets 807, thus, contributing to the whole elastic nature of the mechanism 400. Alternatively, channels 705 may have a loose fit, consequently not engaged with the elastic nature of grommets 807 and not adding to the elastic resistance of the entire framework of mechanism 400 of FIGS. 4a-4f and 5a-5b. Again, the desired application of any radial-hinge mechanism will generally help predetermine properties of its immediate components, with due recognition to the fact that certain properties achieved by spoke alteration may also be achieved by a variety of connector alterations.

Figure 34:
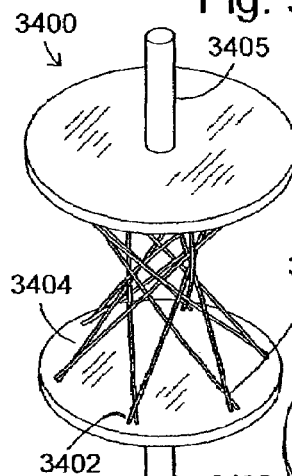
FIG. 34 is a perspective view of a radial-hinge mechanism fixed between two disks with shafts attached.

It should also be appreciated that a radial-hinge mechanism made with multiple spoke-end connectors will more easily allow the device to be constructed from its pattern in contrast to the more difficult methods necessary to form a radial-hinge out of a single elongated member. Spoke-connectors may also act as temporary fasteners to initially get the mechanism into its fully interconnected three-dimensional form, then to open it up to some desired position and then to remove the connectors to place spoke-ends or spoke-sections into some other temporary or permanent holding material, device, apparatus, etc. FIG. 34 depicts a spindle-like device 3400 fashioned upon radial-hinge technology, where the radial-hinge mechanism was first composed from its pattern with spoke-end connectors, then opened on its hinge to a desired degree, followed by removal of spoke-end connectors to transfer spoke-ends 3402 into retaining holes in disks 3404.

Another particularly useful connector of a slightly different sort and again employed to connect just two spokes at a time is depicted in FIG. 9. Double-clip connector 900 is composed of two somewhat elongated C-clips 902. The clips 902 are again shown in FIG. 10 connected back to back with a loose fitting rivet 905, creating a point-hinge, which also acts as a fastener to hold the two C-clips 902 together. Consequently, the double-clip connector 900 may link two spoke members at any cross-location or where spoke-ends meet (as shown in FIG. 9). In FIGS. 11a-11b, two different views of the connector 900 illustrate the range of swivel, which may ultimately achieve 360 degrees of movement. Thus, the connector 900 is applicable to a variety of radial-hinge mechanisms with compatibly-sized spokes and, in this manner, provides a universal spoke-connector for radial-hinge mechanisms; a connector which may also be altered for special applications. The double-clip connectors 900 may be made of steel, plastic, fiberglass, composite or other materials. Typical C-clips would range in shape from fully circular to partially circular (as depicted by the clips 902 of FIG. 10) and point-hinge rivet 905 may be replaced by more sophisticated swiveling mechanisms, depending on the application.

The procedures for constructing radial-hinge mechanisms may also vary and, in some situations, may not use interim connectors. In all likelihood, a high level of skill in the art of radial-hinge assembly will lead to shortcut-methodology for constructing a radial-hinge mechanism. In general, any method of connection or variety of connector best suited for any one or more applications is, of course, preferred. Many other special connectors may be utilized, some to work with more than two spokes, some to have other actions built into them, such as the double-capped inter-hinge connectors 4504 (see FIG. 46) discussed herein.

C. Inner-Aperture/Outer-Circumference; Opening the Radial-Hinge

With reference again to FIGS. 4a-4f, the twelve-spoke radial-hinge mechanism 400 is shown in three different positions, to illustrate its full and common transformational nature from its minimum to maximum range of operation. While the spokes 402 and connectors 404 generally remain the same in their material dimensions as the radial-hinge mechanism is opened or closed, the mechanism's inner-aperture 407 and outer-circumference 406 may systematically dilate or contract as the mechanism 400 is opened or closed.

In a first position shown in FIGS. 4a-4b, the radial-hinge mechanism 400 is shown in standard front and side views with the mechanism 400 fully-closed and in the typical mode of its initial construction when first composed from the pattern of its design. In this position, the key circular parameters of the mechanism 400 are defined by its inner-aperture 407 and its outer-circumference 406. Both of these circumferences are at their maximum diameters in this position. In a second position shown in FIGS. 4c-4d, the circumferences have constricted considerably. In a third position shown in FIGS. 4e-4f, the mechanism 400 is fully-opened and the circumference 406 and the inner aperture 407 reach their minimum diameters. In this depiction, there is easily a seven-fold reduction of the diameter of the outer-circumference from the first position to the third position and a 90-degree transalignment of the mechanism 400. Specifically, the radial-hinge mechanism changes from one that can be contained in a flat disk-shaped form to one that can be contained in a long tubular form.

As for the designations of opened and closed, these derive their orientation from the way the radial-hinge opens from its original two-dimensional design. This opening also correlates with the opening of the space defined by the inside volumes of a radial-hinge's double-conical-like framework, which stretches open and extends out into its opposite major axis. However, this function of opening also ignores the anomaly of how a radial-hinge mechanism physically closes down upon itself when in its fully-opened mode (as in FIGS. 4e-4f) along with simultaneously closing down its inner-aperture and outer-circumference. Additionally, given the perspective of a radial-hinge acting as a linkage between two generally parallel surfaces, this linkage or hinge is closed when the two surfaces are closest together.

Finally, there is the hinge itself, the arrangement that makes for the radial-hinge mechanism; the provider of the radial-hinge-action and more or less centralized on the core inter-braiding of the intersection of the mechanism's plurality of spokes. Although, to be more exact, it is the entire mechanism taking part in every hinge action; thus, technically, it is the full-interconnectedness of this assembly which constitutes the singular thing called a "hinge." Nevertheless, the radial-hinge's fulcrum location is in its core and contiguous with the inner-aperture. Here is where the spokes are levers, pivoting in an angular fashion one upon the other and like a braid forming the interwoven and interlocked radial-hinge mechanism. In addition, the hinge-core has the potential to be laterally translocated, typified in FIGS. 5a-5b and shown in one application in FIG. 47. This floating or fluid hinge-core also multiplies the variability of forms applicable to the many versions of radial-hinge mechanisms. But, ultimately, the present invention stands out in its cooperation of basic components to create a highly functional and economical radial scissor-hinge mechanism barring the need for extra or special brackets, fasteners or other hardware to actuate its plurality of functions and forms.

D. Design and Construction of a Radial-Hinge Mechanism

The current invention can be thought of as a three-dimensional mechanism composed directly off the pattern of its embodiment in two-dimensional space. The first act in designing the radial-hinge mechanism is the choosing of its spoke-count and arc-count per chord. These two parameters are cross-referenced in the chart of FIG. 17, which identifies the existence of twenty-six different versions of radial-hinge mechanisms. The chart in FIG. 17 is only a sub-chart or subset of an infinite set of radial-hinge designs theoretically reproducible in three dimensions. With further reference to the chart of FIG. 17, cross-referenced locations with dashes indicate impossible parameters for radial-hinge mechanisms, but this is also typical for all cross-referenced locations where spoke-counts are an even multiple of any applicable arc-count per chord. For the following discussion, a sixteen-spoke radial-hinge mechanism with seven arcs per chord has been chosen with its position emphasized on the chart of FIG. 17.

To begin familiarization with the radial-hinge design features, an understanding of the mechanism's basic spiral form can be helpful. FIG. 18 is something of a graphic representation, specifically, a stripped-down version of the sixteen-spoke radial-hinge design in FIG. 26 and derived from FIG. 26 by removing a certain one-half of every spoke in the sixteen-spoke framework. Skeletonized as such, FIG. 18 becomes a kind of infrastructure of the full design, showing just those most forward (and leading) spoke-halves that give the best visual representation of the unique design behind a radial-hinge mechanism, with black spoke-segments 1804a spiraling out on the backside of the hinge, white segments 1805 spiraling up in the foreground and each view from front or back distinguishing an octagon at the inner-aperture 1808, though the two back-to-back octagons are perfectly out of phase with each other.

In addition, FIG. 18 reveals and clarifies a left-handedness as FIG. 19 displays a right-handedness; with both views being mirror images of each other (as are all full representations of all basic radial-hinge designs). Flipping over FIG. 18 results in FIG. 19, with the understanding that white spoke-segments depict all spokes in the foreground position in both views. Consequently, the black spoke-segments 1804a in FIG. 18 become white spoke-segments 1804b, when turned over 180 degrees into FIG. 19. All radial-hinge devices display this uniform double-spiral design infrastructure with left and right-handedness. FIGS. 1-5b depict a left-handed twelve-spoke radial-hinge design, whereas FIGS. 14-16 and 26 depict right-handed designs. It should be appreciated that both design approaches lead to the same result.

FIG. 20 depicts a circle diagram 2000, with a circle 2008 that is evenly divided by delineations 2006a into sixteen arcs 2002 (with all even numbers of eight and above being eligible—see again chart of FIG. 17). Sixteen chords 2004 are then drawn between the delineations 2006a on the circumference of the circle 2008 and, in this case, to design a sixteen-spoke radial-hinge mechanism with each chord bridging seven successive arcs on the circumference. The dashed line-segments in FIG. 20 indicate typical placements for two end-connected chords 2004 as drawn from "a" to "b" to "c" for the beginning of the continuous back-and-forth crisscrossing as depicted in FIG. 21, and where the circle 2008 of FIG. 20 has been erased from the scene, and where the delineations 2006a become peripheral points 2006b of the emerging mechanism.

FIG. 22 illustrates the results of filling in the chords of FIG. 21 with parallel companion lines to distinguish spokes 2204 of the emerging sixteen-spoke radial-hinge mechanism, which is also defined by its outer limits, those peripheral points 2006b, said points designating the points of the protrusions on this radial-hinge mechanism. FIG. 22 also identifies every other peripheral point 2006b with an "F" to sort out every peripheral point in the foreground of the view. Notably, peripheral points 2006b of FIG. 21 have been de-emphasized in FIG. 22.

Figure 23:
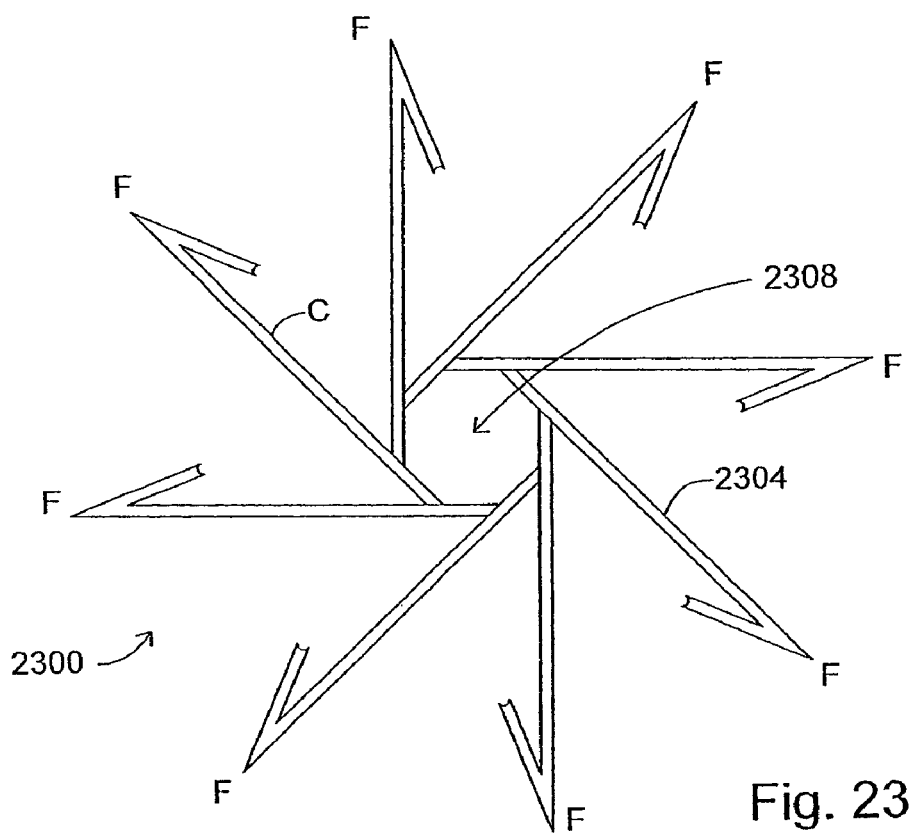
FIG. 23 is a front view of a partial spoke diagram derived from FIG. 22, with only foreground spoke-segments drawn in on a right-handed spiral.

In FIG. 23, the "F" designated peripheral points are isolated out from the full scheme of FIG. 22 along with major consistent spoke sections 2304. The whole diagram 2300 represents the seminal step in the reconciliation of radial-hinge designs and which is again the signature spiraling-form depicted in FIGS. 18 and 19. The inner-aperture 2308 in this diagram 2300 is defined by an octagon. At this stage in the design program, all radial-hinge mechanisms display a polygon around their inner-apertures; a polygon having one-half the number of sides as the total number of spokes in the radial-hinge mechanism being planned.

Figure 24:
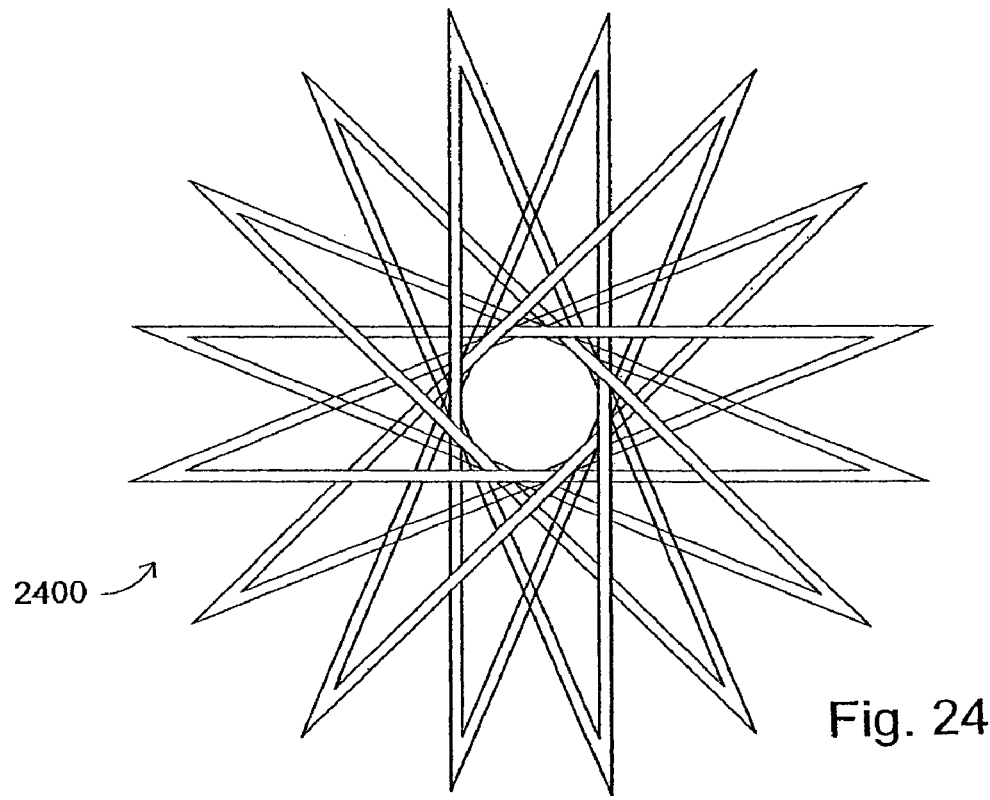
FIG. 24 is a front view of a diagram formed by merging the diagram of FIG. 23 into the diagram of FIG. 22.
Figure 25:
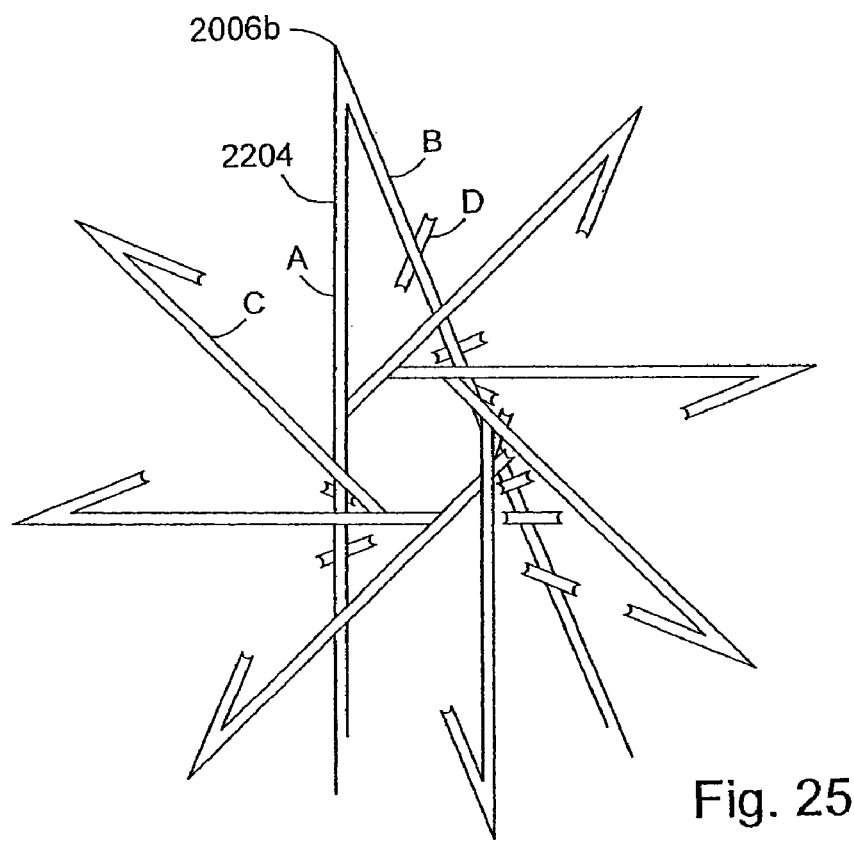
FIG. 25 is a front view of a final-resolution diagram overlaying FIG. 23.

The diagram of FIG. 24 results from installing the pattern of FIG. 23 into the scheme of FIG. 22, or by removing line crossings in FIG. 22 to realize FIG. 24 based upon the seminal pattern in FIG. 23. FIG. 25 resolves the remaining layout necessary to complete the plan for the resultant design 2600 depicted in FIG. 26.

Figure 26:
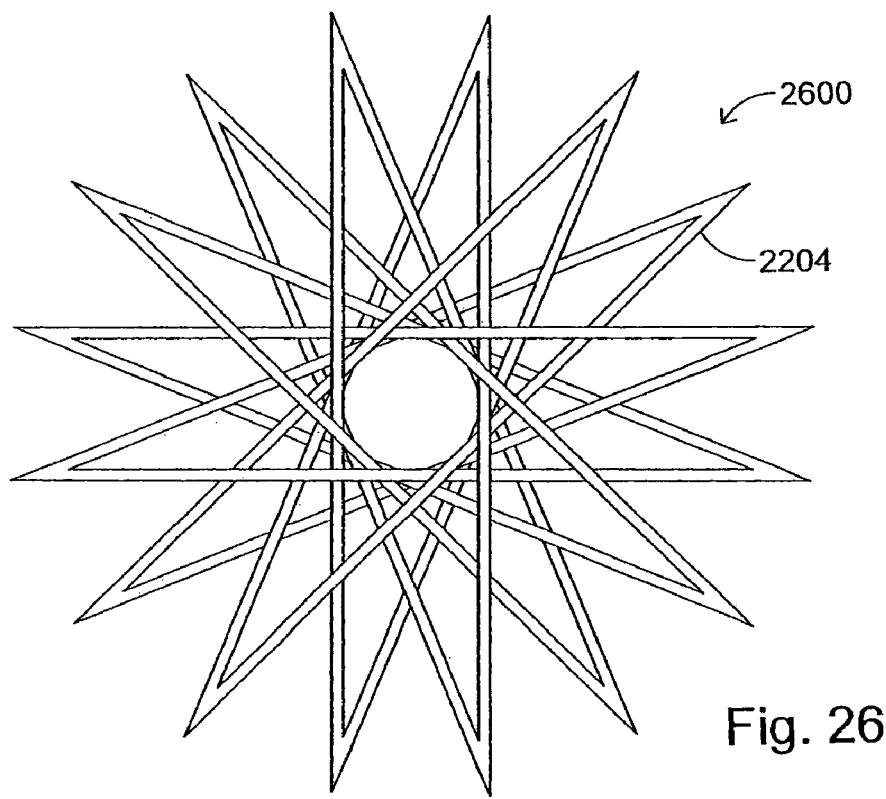
FIG. 26 is a front view of a final diagram that is formed by merging the diagrammatic resolutions of FIG. 25 into the diagram of FIG. 24.

With reference to FIG. 25 (a derivative of FIG. 23), by following the specified paths of one pair of spokes 2204, such as spokes A and B, and applying all resolutions of their pathways to all other spoke-pairs in the proto-hinge 2400 of FIG. 24, the result is the completed design 2600 depicted in FIG. 26. Specifically, the path of spoke A traveling away from its connection with spoke B is a clear run to spoke C, though having also passed over seven other spokes (not shown). Then, spoke A passes under spoke C (as is also observed in FIG. 23). From there, the path of spoke A continues over, then under, then over, then under subsequent spokes on its way to its opposite spoke-end. This over/under sequence applies to all versions of radial-hinge designs worked out with the geometric accuracy of straight spokes and equal angles, although other versions of radial-hinge mechanisms may have more or fewer crossings than what is required in this sixteen-spoke version based on seven arcs per chord.

The path of spoke B also traveling away from the peripheral point 2006b in FIG. 25 is descriptively the exact opposite of the path described for spoke A. That is, spoke B first passes over spoke D, then under the next spoke, then over the next spoke, then under the next spoke, then over, then under the remaining seven spokes. Consistently, just as the path of spoke A away from peripheral point 2006b begins by passing over the first seven spokes, the path of spoke B ends by passing under the last seven spokes. This radial-spiral symmetry is indicative of all radial-hinge mechanisms. Furthermore, the seven spokes passed over by these foreground seminal spokes and the seven spokes passed under by the backside seminal spokes, correlate with the chart cross-reference in FIG. 17 for arc-count per chord, further revealing a seven-layered overlap of spoke crossings in this sixteen-spoke radial-hinge design keyed on seven arcs per chord. This correlation is common amongst all versions of radial-hinge mechanisms, with mechanism 100 of FIG. 1 posing as another example, being five-layered, with five arcs per chord. This aspect of layering vis-a-vis arc-count per chord suggests greater complexity and difficulty in construction as the arc-counts per chord get larger.

With all spokes reconciled into their proper arrangement, depicted in FIG. 26, the design 2600 is complete. Turning this line-drawing into a radial-hinge mechanism is simply the matter of employing design 2600 as a pattern, and sizing the pattern to match with the size of actual spokes intended for the construction. Actual spokes are then placed upon the pattern and directed into the same spoke juxtapositions as the pattern depicts, spokes connected to other spokes one at a time, following the under/over pathways, sequentially building the hinge, until the last spoke meets up with the first spoke and, upon making that last connection, the radial-hinge mechanism achieves its completeness in total interconnectedness. Placing or scribing the numbers 1-16 on the spokes 2204 to correlate with spoke identification numbers on the pattern 2600 can be very helpful in this construction task. When constructing a radial-hinge mechanism out of wooden dowels, a general guideline for spoke dimensions is to figure a ratio of at least sixty-to-one for length-of-spoke in comparison to spoke-diameter and generally at most a ratio of ninety-to-one, although this relationship will also depend largely upon spoke-count and application needs.

With reference to FIGS. 12*a*-12*b*, the spokes 102 may be cut, then crudely or expertly threaded and/or glued together one upon another, as in FIG. 6, with spoke-end connectors 104 screwed on. Similarly, the sixteen-spoke radial-hinge mechanism designed by these instructions may also follow the composition format of FIG. 6, except that the angle of the cut on the spoke-ends, as shown in FIGS. 12*a*-12*b*, will be different because the angle of the convergence of spoke-ends is different in different versions of radial-hinges, angles ranging between 0 to 180 degrees. These angles of convergence of spokes in a radial-hinge can be lifted with a protractor directly off the layout of the design or deduced by various mathematical operations employing spoke-count and arc-count per chord as two of the known variables. For the two versions of radial-hinge mechanism most prevalent in these specifications, the angles of spoke convergence are easy to calculate because the quotient of 360 degrees divided by the spoke-count equals the angle of convergence. For the twelve-spoke radial-hinge mechanisms 100 and 400, shown in FIGS. 1-5, this equates to 30 degrees. For the sixteen-spoke version in FIG. 26, the equated angle is 22.5 degrees. Subsequently, the angle for consistent cuts on spoke-ends are one-half the measure of the angles of convergence, i.e., cuts of 15 degrees on spokes for the twelve-spoke version and 11.25 degree beveled cuts on the spokes of the sixteen-spoke radial-hinge mechanism design 2600 in FIG. 26.

Consequently, however, the end connector 104 in FIG. 6 (with an inner-thread cut to accommodate the 30 degree convergence angle on the pairs of spokes 102) may not be a good connector for the 22.5 degree convergence angle of the sixteen-spoke radial-hinge. On the other hand, off-the-shelf twist-on wire-connectors equipped with conical inner-springs will actually accomplish the task in both situations due to the amorphous nature of the springs, but which also will not result in highly rigid connections and twist-on wire-connectors are not available in an adequate variety of sizes for all situations.

The resultant three-dimensional construction made from the two-dimensional single view is a radial-hinge in the purest sense, with all spokes of equivalent length, all connections identical and parallelism replete. In general, radial-hinge mechanisms with greater arc-counts per chord will have smaller inner-apertures, which, in turn, concentrate the hinge more densely, thus, allowing it to open more easily and to a greater extent. It is also expected that some versions of a radial-hinge mechanism with high spoke-count and low arc-count per chord will also result in densely packed hinge-cores and likewise perform in a less resistant manner. In addition, the unique radial-hinge mechanism design-criteria are also the most logical and viable design-criteria for bringing about the unique principles and actions characteristic of the radial-hinge mechanism.

Not incidentally and to be appreciated, all radial-hinge mechanisms are based on multi-point star-designs but not all radial-hinge mechanisms resemble stars or necessarily have star-points. FIG. 16 is similar to FIG. 26, except that its peripheral points have all been truncated. Variations in the design of any and all radial-hinge mechanisms may start on paper. Other variations may occur after the mechanisms have already been composed according to pattern.

Furthermore, applications for radial-hinge mechanisms may also prove to be highly variable. A brief look at the kinds and forms of products likely to result from a radial-hinge mechanism's utility in function and form comes into perspective over a range of different devices and apparatus.

E. Radial-Hinge Mechanisms in Rigid/Semi-Rigid Applications

Radial-hinge mechanisms of various designs can be employed as rigid and semi-rigid frameworks for a vast number of radial-hinge devices and apparatus, with many of the resultant forms interfacing with an external sheathing or covering. The sheathing or covering may be used merely to enclose the radial-hinge mechanism and/or elastic sheathing materials may be used to influence the dynamic properties of the radial-hinge mechanism therein employed. A sampling of radial-hinge mechanisms interfaced and interconnected with various coverings and attachments are depicted in FIGS. 27-54. These devices and apparatus are based on the twelve-spoke radial-hinge mechanism(s) 400. It should be appreciated that this format of using just one version of the radial-hinge mechanism is strictly intended to keep the forms simple, consistent and not meant to represent finished products and not intended to represent the full plurality of likely or potential radial-hinge devices and apparatus across the range of the numerous versions of radial-hinge mechanisms.

In regard to the end-connectors 404, these may actually be functional in the range of devices and apparatus depicted. In practice, however, a wide assortment of other kinds of radial-hinge body-connectors and end-connectors, some discussed herein, may work better, depending upon the application. The spokes 402 may also be replaceable by other more or less sophisticated spoke designs.

Figure 28:
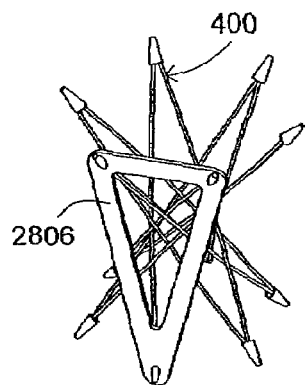
FIG. 28 is a perspective view of a radial-hinge mechanism held open by a constraining triangular jig.
Figure 29:
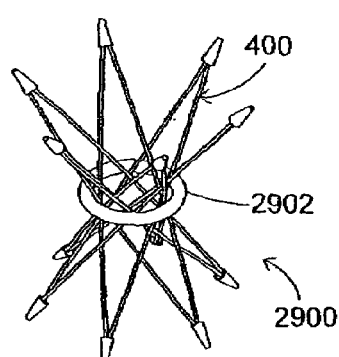
FIG. 29 is a perspective view of a radial-hinge mechanism held open by a constraining band around its hinge-core.
Figure 30:
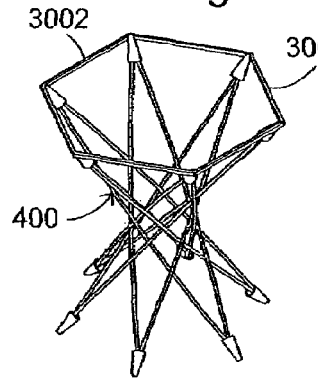
FIG. 30 is a perspective view of a radial-hinge mechanism held open by a set of links constraining the full upper set of peripheral points.

Starting with FIG. 27, a radial-hinge device 2700 is shown and similar to radial-hinge mechanism 400 in FIG. 4, except for where a slat 2702 supplants the connectors 404 at two of the spoke-end connecting positions, consequently resulting in a device 2700 whose radial-hinge mechanism displays an example of peripheral points no longer confined to only two parallel planes. Overall, this is not a stable radial-hinge device for loading purposes, nor are the variably-constrained mechanisms 400 in FIGS. 28-30. Altogether, these four views (FIGS. 27-30) illustrate some typical methods of propping open a radial-hinge mechanism against the mechanism's naturally resisting closed position. Essentially, in FIG. 27, an elastic or rigid slat 2702 holds open its radial-hinge mechanism. In FIG. 28, a rigid triangular jig 2806 holds open radial-hinge mechanism 400. In FIG. 29, an elastic or rigid band 2902 holds open the mechanism 400. FIG. 30 depicts elastic or rigid links 3002 holding open the mechanism 400. Various other performances of action may be realized from these modified radial-hinge mechanisms, which are only partially load-bearing radial-hinge frameworks. For example, the constraining band 2902 of FIG. 29 may be particularly useful and very easily installed in some situations by fully opening mechanism 400, then slipping on the band 2902. Consequently, within this mode and when the band 2902 has some elastic give, the entire device 2900 becomes reverse-biased in its elastic nature, thus, requiring force to close its springiness rather than its normally common characteristic of needing force to be opened. The elastic properties and force-characteristics of the radial-hinge mechanism are extremely diverse, depending on construction methods and material variations. In general, the radial-hinge mechanism may be sprung either way or not sprung at all, or it may have timely and variable elastic properties due to changes in temperature, changes imposed by electric or magnetic influence or other known ways to artificially influence the properties of the materials of the mechanism.

Some applications may utilize the catalytic assistance of some sort of constraining band and, overall, this exemplifies the dual nature of the radial-hinge mechanisms. That is, the radial hinge mechanism is able to hold together two parallel surfaces of which it is attached to and able to push apart these surfaces when a reverse bias is created by a constraining band or other reverse-spring-biasing method. In addition, as the band 2902 acts to constrain movement toward the closing of device 2900, the band 2902 also helps to fix the core of the radial-hinge mechanism into a desired position along its fluid range (see FIG. 47, which includes a band 4702 similar to the band 2902).

Figure 31:
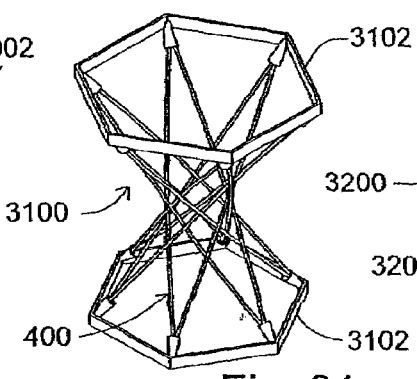
FIG. 31 is a perspective view of a radial-hinge mechanism held open by two sets of beams constraining all peripheral points, top and bottom.

FIG. 31 shows beams 3102 constraining radial-hinge mechanism 400 at both ends, thus, creating a much stabler and fixed framework for device 3100 in comparison with those forms in FIGS. 27-30. A constraining band 2902 around the center of this device 3100 would further increase its load-bearing capacity, as would other types of constraining devices and methods, and including the employment of the double-clip connectors 900 depicted in FIGS. 9-11b.

Figure 32:
FIG. 32 is a perspective view of a partially-covered version of the device of FIG. 31.
Figure 33:
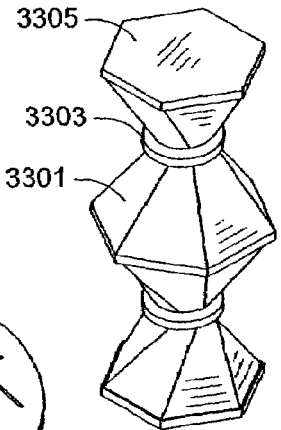
FIG. 33 is a perspective view of a fully-covered stack of two radial-hinge mechanisms, including a double constraining-band encircling both hinge-cores.

FIG. 32 shows one approach to covering the radial-hinge device 400, with a fascia material 3205, to then convert it to a container or chamber 3200. FIG. 33 shows another approach to external dressing-up, also built upon the framework of FIG. 31, though herein showing a stack of covered-over or encased radial-hinge mechanisms affixed with plates or fabric 3301 and bound further by central bands 3303 and given top covers or plates or fabric 3305. This finished encasement may also be the prototype for artificial (i.e., decorative) building columns or that of an unusual design for a drum with surface 3305 then being a drum-skin. In addition, FIG. 31 may be a framework for a basketball basket; moreover, a stacked-basket for basketballs or any-sized balls; or a ball basket with an adjustable inner-aperture 408, as explained in connection with FIGS. 4a-4f; and other permutations of similar apparatus for basketing balls and the like. FIG. 32 may also be seen as a style for columnar designs, or the likes of a stacked raceway for wires, pipes, etc. Various different drum versions may also be achieved with this form.

Figure 35:
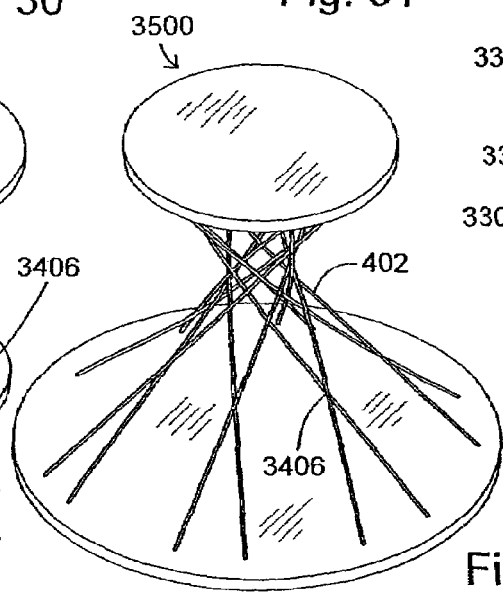
FIG. 35 is a perspective view of a radial-hinge mechanism fixed between two differently sized disks, with extended spokes depicted in its bottom half.

FIGS. 34 and 35 express two alterations in comparison to previous FIGS. 27-33 and yet both FIGS. 34 and 35 also represent generally fixed-in-form radial-hinge devices. In FIG. 34, spoke-end connectors have been removed and spoke-ends 3402 are affixed into disks 3404 and the disks at both ends of this radial-hinge device 3400 are further attached to shafts 3405. In addition, peripheral points 3406 in FIG. 34 are designated to directly correspond to peripheral points 3406 in FIG. 35.

In FIG. 35, radial-hinge device 3500 is similar to device 3400 in FIG. 34, except that shafts 3405 have been removed and spokes 402 have been extended divergently from peripheral points 3406, creating yet another arrangement characteristic of radial-hinge versatility and suggesting yet further designs for radial-hinge devices and apparatus incorporating disks and wheels, shafts and axles, turning and spinning, functioning in various rotary applications, including the transferring of differential rotational forces. In addition, cages, spools, spindles, and sheaves may be achieved with the radial-hinge devices 3400 and 3500.

In FIGS. 36-41, the radial-hinge mechanism 400 is involved within the familiar fixed apparatus of a sink-and-stand 3600 in FIG. 36, table and lamp 3700 in FIG. 37, chair 3800 in FIG. 38, bed 3900 in FIG. 39 (with its radial-hinge fully-closed), a birdbath, solar oven, radiowave-collector 4000 in FIG. 40 and one likely building scheme 4100 in FIG. 41, e.g., a small stadium or circus tent. In addition, frameworks for benches, tables, decks and scaffolding around trees, around swimming pools and other central themes can be conceived out of radial-hinge designs (see the mechanisms in FIGS. 14 and 15). Basically, anything that stands on legs may be accommodated by these radial-hinge designs, which also includes docks, towers, teepees, circular fencing, coat/hat-racks, bag-holders, drum-stands, platter/plate-holders, cup-holders, any cylindrical-type standing-up holders, etc. and each of these aforementioned implementations generally express at least one unique quality over their counterpart conventional form. But caution should also accompany implementation due to the scissor-hinge-like action which may be a hazard requiring consideration in most radial-hinge productions. Of course, radial-hinge mechanisms employed in trap and snare apparatus are intended hazards.

With regard to the stationary forms depicted in the various prototype devices of FIGS. 36-41, some may have an elastic give to them, a kind of bounce and/or some may be intentionally collapsible for portability or adjustability and/or intended for shock-absorbing applications. Thus, usual parameters for solid-structure-design may not exactly apply to many of these common, familiar, radial-hinge devices and apparatus and may require designed-in safety factors based on probable loads, torques, angles of radial-hinge-openings, etc.; to, essentially, design around inter-dimensional stresses to sufficiently reduce fatigue in all component materials such that even in extremely high-stress situations elastic limits can be avoided.

F. Radial-Hinge Mechanisms in Active Applications

The radial-hinge mechanism multiplies its potential usefulness when put into an active role in active devices and apparatus and, though many of these productions will only entail the inclusion of a single radial-hinge mechanism, the greater variety of these active forms will be composites of two or more radial-hinge mechanisms variously connected together into a stack.

The first indication of the radial-hinge's intrinsic design-feature of "stacking" is shown in FIG. 33 as a fixed object. In a similar fashion, a stack of radial-hinge mechanisms may also be interconnected to operate cooperatively in active roles of extension and retraction.

With reference to FIGS. 42a-42b, a device 4200 is comprised of two radial-hinge mechanisms 400 connected end to end by six straight coiled-springs 4203 (shown in original form in FIG. 44, enlarged) joined to spoke-end connectors 404. As with an elastic constraining-band 2902 around radial-hinge mechanism 400 in FIG. 29, these connecting springs 4203 also encourage this stacked radial-hinge device 4200 to assume an "opened" mode (again becoming reverse-biased in its elastic nature, i.e., reversing its first tendency to be "closed"). The arrows in FIG. 42b indicate that a force is required to keep this radial-hinge device closed down.

In FIG. 43, a G-decelerator apparatus 4300 has a framework based on a three-high-stack of radial-hinge mechanisms 400, which are interconnected with coiled-springs 4203. In addition, the apparatus 4300 is also interfaced at both ends with further components 4301 on the top and 4303a on the bottom. The component 4301 is a kind of pouch variably composed but generally incorporating soft, strong, elastic fabric to catch a delicate object 4308 and effectively prevent the object from bouncing back out when this apparatus 4300 recoils after it has collapsed or closed down (similar to device 4200 in FIG. 42b) and due to the force of the mass of falling object 4308. Base component 4303a is here shown as a disk with spoke-end connectors 404 plugged into slide-tracks 4306a to guide and hold the connectors 404 in a stable, planar semblance, as apparatus 4300 is activated by a falling object 4308. This base component 4303a also aids in the stability of the entire radial-hinge apparatus 4300 by helping to prevent toppling. Object 4308 may also be other than an acrobat or person leaping from a burning building and pouch-component 4301 may be other than soft and yielding. Similar useful apparatus will resemble this apparatus 4300 in the guise of weight-scales, vertical-lifts of various sorts, trampolines, radial-catapults, gantry-arms on space vehicles, landing-pods for various airborne vehicles, etc. Again, it should be noted that constraining bands 2902 (or similar rings, hoops, straps, lashes, belts, etc.) may also be incorporated or retro-fit to increase resistance in these stacked, active devices and apparatus and the bands 2902 may also act as break-bands, to actually self-destruct (or release) when stresses reach a specific threshold.

With regard to FIGS. 45 and 47, two similarly stacked radial-hinge apparatus 4500 and 4700, respectively, are shown. The apparatus 4500 and 4700 each include two radial-hinge mechanisms, which are interconnected by double-capped inter-hinge connectors 4504 instead of utilizing coiled-springs 4203 (depicted in FIGS. 42-44). The connectors 4504 (depicted in FIG. 46) are comprised of two push-on cap-connectors 4601 similar to caps 404 in FIGS. 4a-4f, except that caps 4601 have a flat side 4606 formed into their conical lateral dimension, with a line-hinge 4609 that attaches the caps 4601 in a pivotal configuration. Unlike coiled-springs 4203, double-capped inter-hinge connectors 4504 pivot freely, without elastic resistance.

In FIG. 45, the stacked radial-hinge apparatus 4500 is comprised of a typical radial-hinge mechanism 4506 (similar to mechanism 400 in FIG. 4) and a radial-hinge mechanism 4507, which is slightly atypical with its free set of peripheral points depicted as fused or formed and subsequently bent in toward an imaginary central axis of apparatus 4500, thus, creating a kind of mechanical hand of six fingers 4508. As is shown, a ball 4509 has been picked up by apparatus 4500 and remains firmly held until released by the action of this prototypical arm and hand apparatus 4500.

FIG. 47 depicts an apparatus 4700 similar to apparatus 4500 in FIG. 45, except that radial-hinge mechanism 4506 in FIG. 45 is supplanted by a larger radial-hinge mechanism 4706 in FIG. 47 and the larger mechanism has necessarily translated the location of its radial-hinge core to reasonably interconnect with its smaller counterpart mechanism 4507. Constraining band 4702 (similar to band 2902 in FIG. 29) is also attached to modify the forces throughout this arm and hand apparatus 4700.

Stacked, active radial-hinge devices and apparatus may be useful in many applications beyond the few so far mentioned and variably depicted. In the medical field alone, single and stacked radial-hinge mechanisms may bring innovations to instruments, such as retractors, forceps, hemostats, etc., as well as improvements in splints, stents, casts and so forth.

It should also be appreciated that radial-hinge mechanisms may be interconnected in a similar manner to coiled-springs arrayed to form cushions for beds, for other furniture and other cushioning and related applications. And not to be overlooked, a radial-hinge toy-set apparatus also comes to mind and already appears well represented in the forms and components herein discussed and depicted in the drawings.

Also to be included in the mix of properties so far discussed, there is again the aspect of handedness previously defined and, though only a minor aspect of a single radial-hinge mechanism or device, the feature of handedness is apparently a significant feature in the act of stacking, wherein one radial-hinge mechanism may be interconnected to a second radial-hinge mechanism in two opposite ways. That is, by connecting a like-handed side of one radial-hinge mechanism to the like-handed side of an adjoining radial-hinge mechanism or by joining a left-handed side to a right-handed side.

Figure 48:
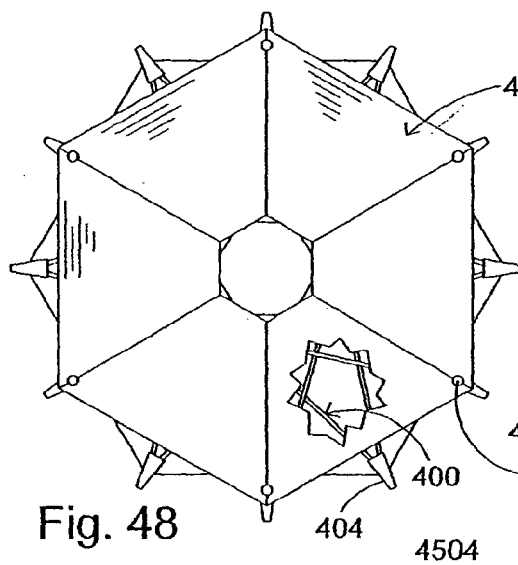

The active nature of radial-hinge mechanisms also takes on the range of apparatus used to inhale and exhale gases and fluids in the form of bellows interfaced externally or internally with the framework of single or stacked radial-hinge mechanisms. As an example, FIG. 48 depicts a single bellows-insert 4800 interfaced within and around radial-hinge mechanism 400 and the insert 4800 is attached to connectors 404 of mechanism 400 at attachment points 4803 (although a similar radial-hinge apparatus may not require attachment points or positioning posts of any sort, depending on the application).

Figure 49A:
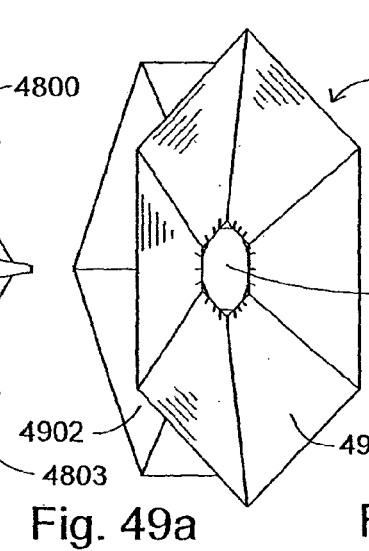
FIG. 49a is a perspective view of the bellows-insert of FIG. 48, without the accompanying radial-hinge mechanism of FIG. 48.
Figure 49B:
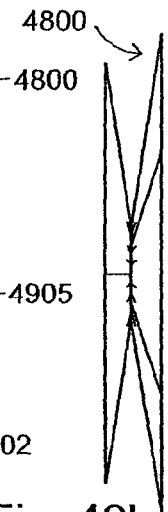

FIGS. 49a-49b show the single bellows-insert 4800 in a perspective view in FIG. 49a and in a side view in FIG. 49b. This particular bellows design and insert 4800 is a combination of two identical concave umbrella-like forms 4902, each composed of six triangular-shaped facets with each form 4902 stitched together back-to-back around an inner-aperture 4905. Notably, forms 4902 are also exactly out of phase with each other in keeping with the phase-shift inherent in all standard radial-hinge mechanisms where peripheral points on one side are typically out of phase with peripheral points on the opposite side.

Figure 50:
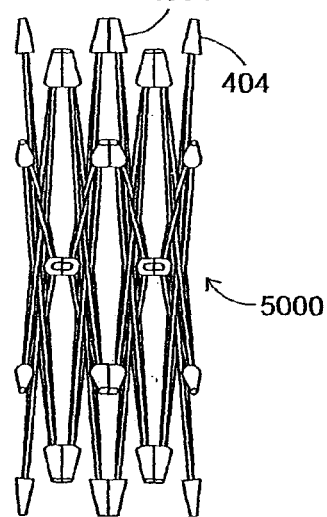
FIG. 50 is a side view of a fully-closed four-deep stack of radial-hinge mechanisms, with inter-hinge connectors of FIG. 46.
Figure 51A:
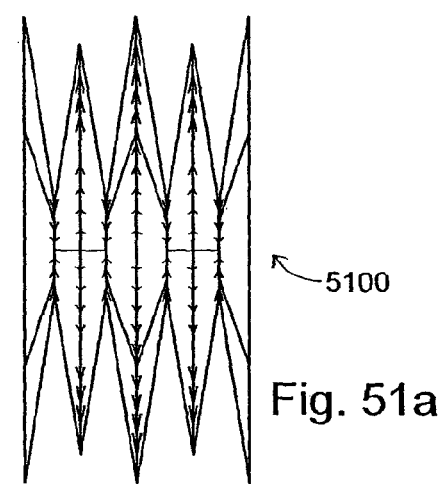
FIG. 51a is a side view of a fully-closed four-deep stack of interconnected bellows-inserts and sized to be used with the device of FIG. 50.
Figure 51B:
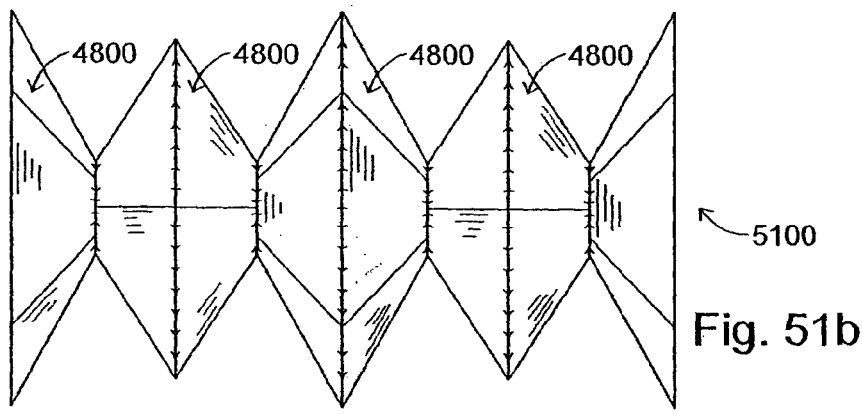

In FIG. 50, a stack of four radial-hinge mechanisms is attached end-to-end by double-capped inter-hinge connectors 4504 to create radial-hinge device 5000. As is shown in FIG. 51a, a composite of four single bellows-inserts 4800 are stitched together along their outer peripheries to make one compound bellows 5100 intended to be fixed or loose within the framework of the device 5000 in FIG. 50. FIG. 51b depicts multiple bellows 5100 in a partially opened view, thus, inhaling and assuming that bellows-inserts 4800 are composed of partially or totally impermeable material, which is also pliable and/or elastic in nature. In a much simpler fashion, regular balloons and/or compound balloons standing in for the custom bellows 4800 would function similarly, though probably less effectively or compactly, and bellows-forms of many other conceivable configurations are likely to be abundant. Used in bellows applications, radial-hinge mechanisms involved in pneumatic and/or hydraulic systems may be useful in pressure relief, pressure maintenance and flow-control functions for valves, nozzles, gauges, etc, including the pushing of air in organs, concertinas and various pumps for various purposes.

In FIG. 52, a radial-hinge apparatus 5200 is comprised of radial-hinge mechanism 400 ensconced within the two wheel-forms 5202 and each form 5202 is also connected with six co-planar peripheral points of the mechanism 400 and the connections may be elastic or rigid. The apparatus 5200 suggests applications for a more road-worthy or off-road-worthy wheel apparatus, though also assuming its inner-cavity is suitably isolated within a membrane to keep debris from corrupting the inner-works. Radial-hinge wheel-apparatus 5200 may be designed to open on its radial-hinge mechanism or be designed to follow a more rigid stance with negligible give. Either way, the force variables will differ from the conventional and single wheel/tire forms and likely be superior in certain applications.

In FIGS. 53a-53b, a twelve-spoke radial-hinge mechanism 5301 is implemented within a clutching/braking apparatus 5300. The apparatus 5300 is also comprised of a circular disk 4303b (similar to base component 4303a in FIG. 43) on one side of mechanism 5301, with a fixed clevis 5304 on the other side. Both disk 4303b and clevis 5304 are endowed with slide-tracks 4306b to facilitate the opening and closing of mechanism 5301. Through the central openings of clevis 5304 and disk 4303b and through the inner-aperture of the radial-hinge mechanism 5301 runs a shaft 5305 on a fixed axis. An arrow in FIG. 53a shows the shaft 5305 in rotational motion. An arrow in FIG. 53b shows a lateral force upon the disk 4303b, which subsequently opens the hinge mechanism 5301 and simultaneously closes down the inner-aperture of mechanism 5301 (as illustrated in FIGS. 4a-4f), consequently grabbing onto shaft 5305 and actualizing functions of clutching and braking and, in this figurative example, the shaft 5205 is brought to a halt in FIG. 53b. A wide variety of forms of this application will be feasible, including arrangements using stacked radial-hinge mechanisms. Similar devices and apparatus employing radial-hinge mechanisms may also serve in bearing-stabilization, shock-absorption, axle-protection and axle-support, as well as in roles to transfer and transmit power.

Another plurality of potential applications for radial-hinge mechanisms resides in the natural juxtaposition of spoke-crossings in all versions of radial-hinge mechanisms where attachments, such as plates, props, fins, blades, etc. automatically assume an equivalent oblique angle to the plane upon which the radial-hinge mechanism is common. FIG. 54 depicts a fan apparatus 5400 showing one such arrangement of blades 5403 attached to the radial-hinge mechanism 400 at points 5405, indicating three attachment points 5405 per blade 5403. In this particular arrangement, the apparatus 5400 may also open its mechanism 400 to regulate the angle of incidence of blades 5403 with the medium that the apparatus 5400 is interacting with, be it a gas or a liquid. Other applications of such devices and apparatus will range from boat props to windmills, including the likes of cutting-blades positioned around the inner-aperture and employed for radial-cutting operations, as in a radial-hinge circular-planer apparatus to cut, hone, grind or otherwise finish dowels and posts, rods and columns of wood, plastic, metal, fiber, etc. Special drill-heads, even turbines, may also evolve out of this modified radial-hinge device, whose radial-hinge action may also be adjustable and result in a more controllable and variable tool or machine apparatus.

G. CONCLUSION

The advantages of a radial-hinge mechanism constructed according to specifications are due to its general simplicity and variable nature, both of which emphasize its uniqueness and versatility and probable application in roles and functions currently and formerly monopolized by more complex, costly devices and apparatus which generally produce the same result. In addition, irrespective of whether the radial-hinge mechanism is constructed of separate spokes or segments, or including an intervening medium to realize other important radial-hinge configurations, or whether the spokes are formed as a continuous member, a radial-hinge mechanism, device or apparatus may be achieved.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A radial-hinge mechanism, comprising:
an even number of at least eight elongated members substantially equal in length and interwoven around and substantially tangent to a generally circular inner-aperture wherewith the elongated members emanate from in a sequentially overlapping spiral manner on both sides of the mechanism, wherein opposite ends of each of the members are connected to the ends of different ones of the members providing a fully interconnected assembly with a variable propensity for one of pivoting open and closed around a substantially circular hinge-core, and wherein each connected pair of the members form a protrusion with a full set of the protrusions defining an outer circumference of peripheral points with alternate ones of the peripheral points lying in one of two parallel planes.

2. The mechanism of claim 1, wherein the assembly is based upon a two-dimensional geometric design derived from a circle of points connected by chords into a regular radial pattern, resembling a star.

3. The mechanism of claim 1, wherein the members are at least one of rigid, semi-rigid and elastic.

4. The mechanism of claim 3, wherein each of the members are made of at least one of plastic, fiberglass, wood and metal.

5. The mechanism of claim 4, wherein the connections are achieved by at least one of connectors, fusion, welding and gluing.

6. The mechanism of claim 5, wherein the connections are substantially secured by connectors to connect one end of one member to one end of another member.

7. The mechanism of claim 6, wherein the members are substantially straight, cylindrical, cross-sectionally consistent, and thereby constituting a plurality of spokes.

8. The mechanism of claim 7, wherein the ends of the members are each angle-cut to meet substantially flush at the connections.

9. The mechanism of claim 7, wherein the connectors are dual-port receptacles each designed to hold the ends of two spokes.

10. The mechanism of claim 9, wherein the dual-port receptacles each include a cap and a dual-holed grommet-insert sized to accommodate the spoke-ends.

11. The mechanism of claim 10, wherein the spokes further include channels formed around spoke circumferences near ends of the spokes, and wherein the channels interface with the grommet holes and are capable of turning within the holes.

12. The mechanism of claim 6, wherein the end-connectors are variably joined with similar end-connectors to provide inter-hinge-connectors for stacking two or more of the radial-hinge mechanisms.

13. The mechanism of claim 12, wherein the end-connectors are joined with a line-hinge to provide an equilateral and stabilized interconnection between two or more of the radial-hinge mechanisms.

14. The mechanism of claim 1, wherein the elongated members are of variable lengths that do not substantially alter the radial-hinge action of the mechanism.

15. The mechanism of claim 1, wherein the members include interconnections made at locations along a length of the members.

16. The mechanism of claim 1, wherein the mechanism includes two singular forms with each of the forms fully inter-connected with one-half of the total peripheral points, and wherein each one-half of the peripheral points are in an opposite but substantially parallel plane.

17. The mechanism of claim 16, wherein the forms are disk-shaped and substantially similar to each other.

18. The mechanism of claim 1, wherein the peripheral points lying in one of the two parallel planes are variably attached to an adjoining form to variably move on tracks or within channels of the form to guide the mechanism's movement in opening and closing.

19. The mechanism of claim 1, wherein the connections are fixed with a double c-clip device with a point-hinge swivel.

20. The mechanism of claim 1, wherein the inner-aperture is transversely occupied by a shaft and the mechanism interfaces with the shaft to one of clutch, brake and grip the shaft.

21. The mechanism of claim 1, wherein one or more of the protrusions are formed as bends in one of the members.

22. The mechanism of claim 1, wherein the assembly includes a cover that one of fully and partially covers the members to create a radial-hinge-based chamber.

23. The mechanism of claim 22, wherein the cover opens and closes with a bellows action while acting in tandem with movements of the mechanism.

24. The mechanism of claim 22, wherein the cover accommodates two or more stacked ones of the radial-hinge mechanisms.

25. The mechanism of claim 24, wherein the cover opens and closes with a bellows action while acting synchronously with the movements of stacked ones of the radial-hinge mechanisms.

26. The mechanism of claim 1, wherein the assembly further includes direct attachments of at least one of a blade and a prop for achieving at least one of fluid movement, cutting and drilling.

27. The mechanism of claim 1, wherein the hinge-core further includes a constraining band to modify movement of the mechanism.

28. The mechanism of claim 27, wherein the band is elastic.

29. The mechanism of claim 27, wherein the band releases at a predetermined threshold of applied force.

30. A radial-hinge mechanism based upon a geometric design derived from the geometry of a circle of points interconnected by chords end-to-end based upon consistent arc-counts with points also defining peripheral points of the seminal design of the mechanism, the mechanism comprising:
one or more elongated members interwoven and interconnected in a radially-symmetrical pattern around a substantially circular inner-aperture providing a resultant assembly with a variable propensity for pivoting open upon a generally circular hinge-core made up of an even number of at least eight hinge crossmembers emanating from the inner-aperture on both sides of the mechanism in a sequentially overlapping spiral fashion; and
one or more interconnections interconnecting the one or more elongated members into the continuous loop monolithic structure the mechanism results in.

31. The mechanism of claim 30, wherein the fully-integrated framework is defined represented by a two-dimensional pattern.

32. The mechanism of claim 30, wherein the elongated member or members are one of rigid, semi-rigid and elastic.

33. The mechanism of claim 32, wherein each of the elongated members is made of at least one of a plastic, a fiberglass, a wood and a metal.

34. The mechanism of claim 33, wherein the interconnections are achieved by at least one of connectors, fusion, welding and gluing.

35. The mechanism of claim 34, wherein the interconnections are located at peripheral points.

36. The mechanism of claim 35, wherein the elongated members are substantially straight, cylindrical, equal in length, cross-sectionally consistent, and thereby constituting a plurality of spokes.

37. The mechanism of claim 36, wherein the spokes include interconnections made at locations along a length of the spokes.

38. The mechanism of claim 34, wherein the interconnections interconnect elongated members at more than two points at a time.

39. The mechanism of claim 38, wherein the interconnections are accomplished by two singular forms with each of the forms fully interconnected with one-half of the peripheral points, and wherein each one-half of the peripheral points are in opposite but substantially parallel planes.

40. The mechanism of claim 39, wherein the forms are substantially similar to each other.

41. The mechanism of claim 39, wherein the forms are disk-shaped.

42. The mechanism of claim 34, wherein one half of the peripheral points of the resultant mechanism are variably attached to an adjoining form to variably move within channels in the form or along tracks on the form to guide the mechanism's movement in opening and closing.

43. The mechanism of claim 30, wherein the interconnections are made with a double c-clip device with a point-hinge swivel.

44. The mechanism of claim 30, wherein the inner-aperture is transversely occupied by a shaft and the mechanism interfaces with the shaft to one of clutch, brake and grip the shaft.

45. The mechanism of claim 30, wherein the framework is fully or partially enclosed by a cover to create a radial-hinge-based chamber.

46. The mechanism of claim 45, wherein the cover opens and closes with a bellows action while acting in tandem with movements of the mechanism.

47. The mechanism of claim 45, wherein the cover accomodates two or more stacked ones of the radial-hinge mechanisms.

48. The mechanism of claim 47, wherein the cover opens and closes with a bellows action, while acting in tandem with movements of the stacked mechanisms.

49. The mechanism of claim 30, wherein the framework further includes direct attachments of at least one of a blade and a prop for achieving at least one of fluid movement, cutting and drilling.

50. A radial-hinge mechanism based upon a geometric design derived from a circle of delineations interconnected by chords end-to-end in regular patterns with the delineations also locating initial peripheral points of the mechanism, the mechanism comprising:
one or more elongated members interwoven and interconnected around a substantially circular inner-aperture to provide a resultant assembly with a fully-integrated framework with a variable propensity for pivoting open upon a generally circular hinge-core made up of an even number of at least eight hinge crossmembers; and one or more interconnections interconnecting the one or more elongated members, wherein the elongated member are one of rigid, semi-rigid and elastic, wherein each of the elongated members is made of at least one of a plastic, a fiberglass, a wood and a metal, wherein the interconnections are achieved by at least one of connectors, fusion, welding and gluing, wherein the interconnections are two-point interconnections that interconnect ends of two of the elongated members, wherein the two-point interconnections are located at peripheral points, and wherein the elongated members are a plurality of spokes of substantially equal length, wherein the peripheral points map out two circles, with each of the circles occupying separate spaced parallel planes, and wherein one-half of the peripheral points are in one of the planes and the other one-half of the peripheral points are in the remaining one of the planes.

51. The mechanism of claim 36, wherein the interconnections are confirmed with spoke-end connectors, each connecting one spoke to another.

52. The mechanism of claim 51, wherein the spoke-end-connectors are dual-port receptacles designed to receive and retain ends of two of the spokes.

53. The mechanism of claim 51, wherein the-spoke-end connectors are dual-port receptacles comprised of caps with dual-holed grommet inserts.

54. The mechanism of claim 53, wherein the spokes further include channels formed around spoke circumferences near ends of the spokes, and wherein the channels interface with the grommet holes and are capable of turning within the holes.

55. The mechanism of claim 51, wherein the spoke-end connectors are variably joined with other spoke-end-connectors resulting in inter-hinge connectors utilized in the stacking of two or more radial-hinge mechanisms.

56. The mechanism of claim 55, wherein the connecting method to variably join spoke-end-connectors to realize the stacking of two or more radial-hinge mechanisms is accomplished with coil-springs.

57. A radial-hinge mechanism based upon a geometric design derived from a circle of delineations interconnected by chords end-to-end in regular patterns with the delineations also locating initial peripheral points of the mechanism, the mechanism comprising:

one or more elongated members interwoven and interconnected around a substantially circular inner-aperture to provide a resultant assembly with a fully-integrated framework with a variable propensity for pivoting open upon a generally circular hinge-core made up of an even number of at least eight hinge crossmembers; and one or more interconnections interconnecting the one or more elongated members, wherein the hinge-core further includes a constraining band to one of restrict and enhance movement of the mechanism.

58. The mechanism of claim 57, wherein the band is elastic.

59. The mechanism of claim 57, wherein the band releases at a predetermined threshold of applied force.

60. A radial-hinge mechanism of elongated members emanating on both sides of the mechanism from the inner-aperture in a sequentially overlapping spiral arrangement providing a monolithic, closed-loop, star-shaped framework with a variable propensity for pivoting open upon a generally circular hinge-core, the mechanism comprising:

sixteen semi-rigid elongated members substantially equal in length and cross-section, interconnected one to another at sixteen peripheral points and based on a pattern with seven arcs per chord with a ratio of approximately sixty-to-one for the length of the members in comparison to the common diameter of the cross-section of the substantially cylindrical members; and sixteen connectors to fully interconnect one to another the sixteen elongated members of the mechanism.

* * * * *

UNITED STATES PATENT AND TRADEMARK OFFICE
CERTIFICATE OF CORRECTION

PATENT NO. : 7,278,245 B2
APPLICATION NO. : 10/623787
DATED : October 9, 2007
INVENTOR(S) : Glenn R. Rouse It is certified that error appears in the above-identified patent and that said Letters Patent is hereby corrected as shown below:

Column 21, lines 44-45, delete "based upon a geometric design".

Column 21, line 63, delete "defined".

Column 23, line 26, delete "the-" after "wherein".

Signed and Sealed this

Twentieth Day of May, 2008

JON W. DUDAS
*Director of the United States Patent and Trademark Office*